United States Patent
Palangie et al.

(10) Patent No.: US 12,504,812 B2
(45) Date of Patent: Dec. 23, 2025

(54) METHOD AND DEVICE FOR PROCESSING USER INPUT FOR MULTIPLE DEVICES

(71) Applicant: Apple Inc., Cupertino, CA (US)

(72) Inventors: Alexis H. Palangie, Palo Alto, CA (US); Aaron M. Burns, Sunnyvale, CA (US); Arun Rakesh Yoganandan, San Francisco, CA (US); Benjamin R. Blachnitzky, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/196,882

(22) Filed: May 12, 2023

(65) Prior Publication Data

US 2023/0333645 A1 Oct. 19, 2023

Related U.S. Application Data

(63) Continuation of application No. PCT/US2021/058598, filed on Nov. 9, 2021.

(60) Provisional application No. 63/113,327, filed on Nov. 13, 2020.

(51) Int. Cl.
| | | |
|---|---|---|
| G06F 3/01 | (2006.01) | |
| G06F 3/0354 | (2013.01) | |
| G06F 3/038 | (2013.01) | |
| G06F 3/0481 | (2022.01) | |
| G06F 3/0488 | (2022.01) | |
| G06F 3/14 | (2006.01) | |

(52) U.S. Cl.
CPC .......... *G06F 3/013* (2013.01); *G06F 3/03547* (2013.01); *G06F 3/038* (2013.01); *G06F 3/0481* (2013.01); *G06F 3/0488* (2013.01); *G06F 3/1423* (2013.01); *G06F 2203/0381* (2013.01)

(58) Field of Classification Search
CPC ...... G06F 3/013; G06F 3/03547; G06F 3/038; G06F 3/0481; G06F 3/0488; G06F 3/1423; G06F 2203/0381; G06F 3/011; G06F 3/04847; G06F 3/0227; G06F 3/04842; G09G 2354/00; G09G 2370/24
See application file for complete search history.

(56) References Cited

U.S. PATENT DOCUMENTS

| | | | | |
|---|---|---|---|---|
| 6,433,774 | B1 * | 8/2002 | D'Hooge | G06F 3/04895 345/157 |
| 8,793,620 | B2 * | 7/2014 | Stafford | G06F 3/04842 715/858 |
| 9,658,687 | B2 * | 5/2017 | Gibson | G06F 3/1438 |
| 10,001,645 | B2 * | 6/2018 | Norden | G02B 27/01 |
| 10,048,779 | B2 * | 8/2018 | Thomas | G06F 3/03547 |

(Continued)

OTHER PUBLICATIONS

PCT International Search Report and Written Opinion dated Feb. 14, 2022, PCT Application No. PCT/US2021/058598, pp. 1-12.

*Primary Examiner* — Mihir K Rayan
(74) *Attorney, Agent, or Firm* — Fernando & Partners, LLP

(57) ABSTRACT

In one implementation, a method of processing input for multiple devices is performed by a first electronic device one or more processors and non-transitory memory. The method includes determining a gaze direction. The method includes selecting a target electronic device based on determining that the gaze direction is directed to the target electronic device. The method includes receiving, via an input device, one or more inputs. The method includes processing the one or more inputs based on the target electronic device.

20 Claims, 37 Drawing Sheets

(56) References Cited

U.S. PATENT DOCUMENTS

| | | | |
|---|---|---|---|
| 10,871,874 B2* | 12/2020 | Sullivan | G06F 3/0487 |
| 2008/0024433 A1* | 1/2008 | Gunther | G09G 5/006 |
| | | | 345/156 |
| 2015/0193018 A1 | 7/2015 | Venable et al. | |
| 2015/0205106 A1* | 7/2015 | Norden | G06F 3/012 |
| | | | 345/7 |
| 2017/0061694 A1 | 3/2017 | Giraldi et al. | |
| 2017/0351471 A1* | 12/2017 | Passeri | G06F 3/033 |
| 2020/0104025 A1* | 4/2020 | Iglesias | G06F 3/0488 |
| 2021/0004133 A1* | 1/2021 | Iglesias | G06F 3/0425 |

\* cited by examiner

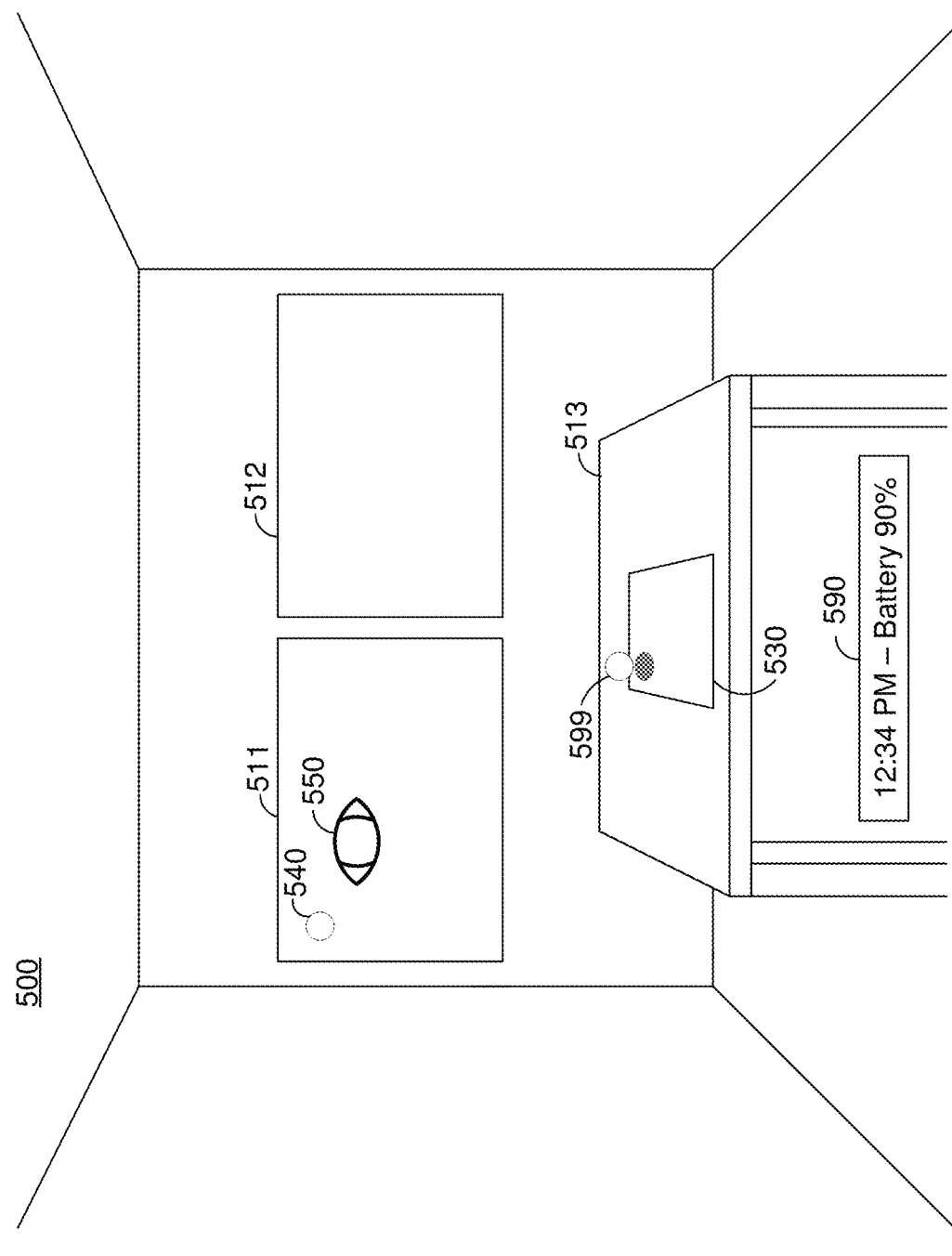

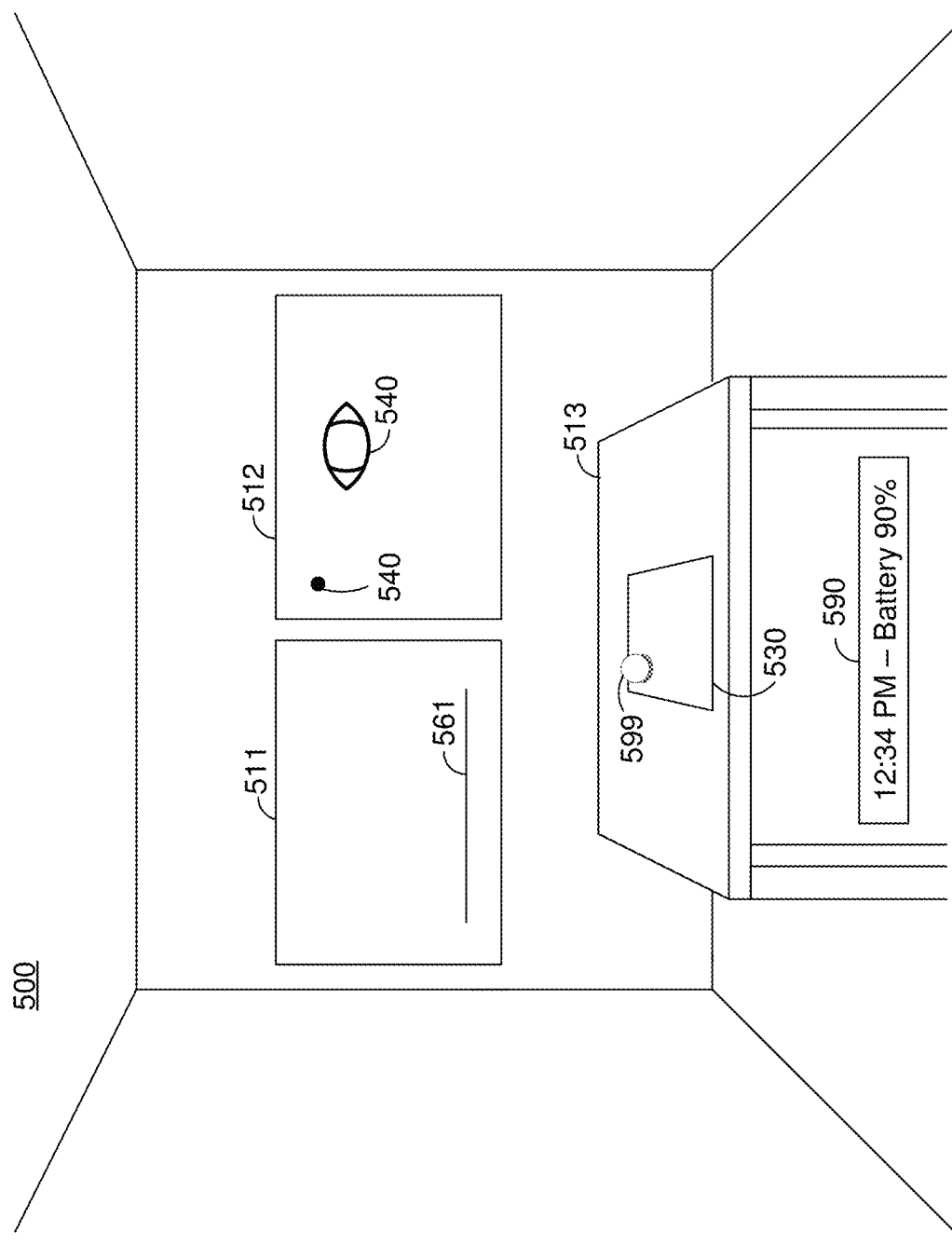

METHOD AND DEVICE FOR PROCESSING USER INPUT FOR MULTIPLE DEVICES

CROSS-REFERENCE TO RELATED APPLICATIONS

This application is a continuation of Intl. Patent App. No. PCT/US2021/058598, filed on Nov. 9, 2021, which claims priority to U.S. Provisional Patent App. No. 63/113,327, filed on Nov. 13, 2020, which is hereby incorporated by reference in its entirety.

TECHNICAL FIELD

The present disclosure generally relates to systems, methods, and devices for processing user input for multiple devices.

BACKGROUND

In various implementations, an environment includes multiple displays. For example, in various implementations, an office includes a desktop computer coupled to two monitors. As another example, in various implementations, a living room includes a tablet with a touchscreen display and a digital media player coupled to a television screen. As a further example, in various implementations, an XR environment includes two virtual displays. In various implementations, providing user input to two different displays requires two different input devices. For example, a tablet may be controlled with a touchscreen and a digital media player may be controlled with a remote.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
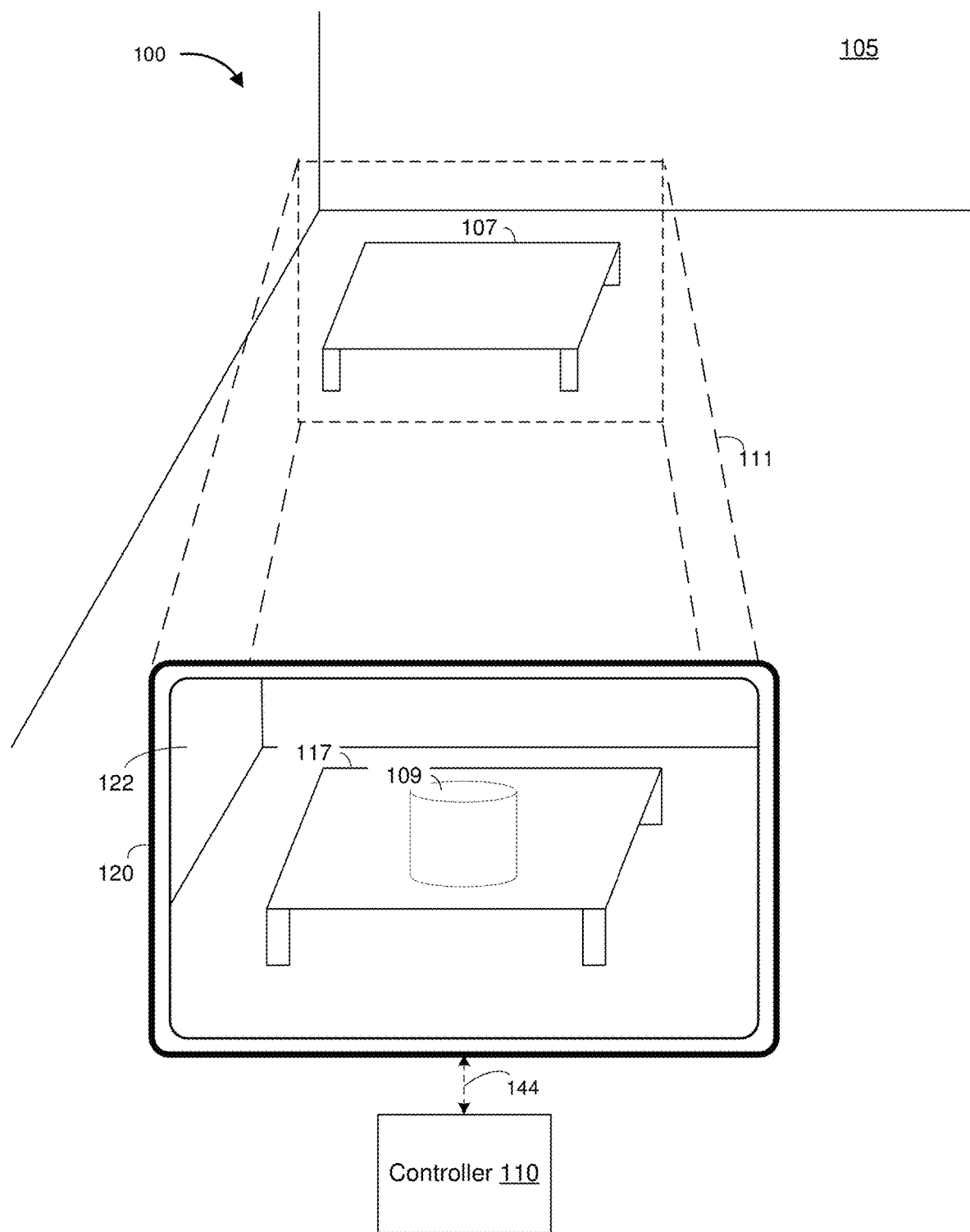
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for processing inputs for multiple devices. In various implementations, the method is performed by a device including one or more processors and non-transitory memory. The method includes determining a gaze direction. The method includes selecting a target electronic device based on determining that the gaze direction is directed to a display of the target electronic device. The method includes receiving, via an input device, one or more inputs. The method includes processing the one or more inputs based on the target electronic device.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an environment includes multiple displays. User input provided by an input device, such as a trackpad, is used to manipulate the display of the display a user is looking at. For example, if a user is looking at a first display, a cursor is displayed on the first display and user input causes content to be displayed on the first display, but if the user is looking at the second display, the cursor is displayed on the second display and user input causes content to be displayed on the second display.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
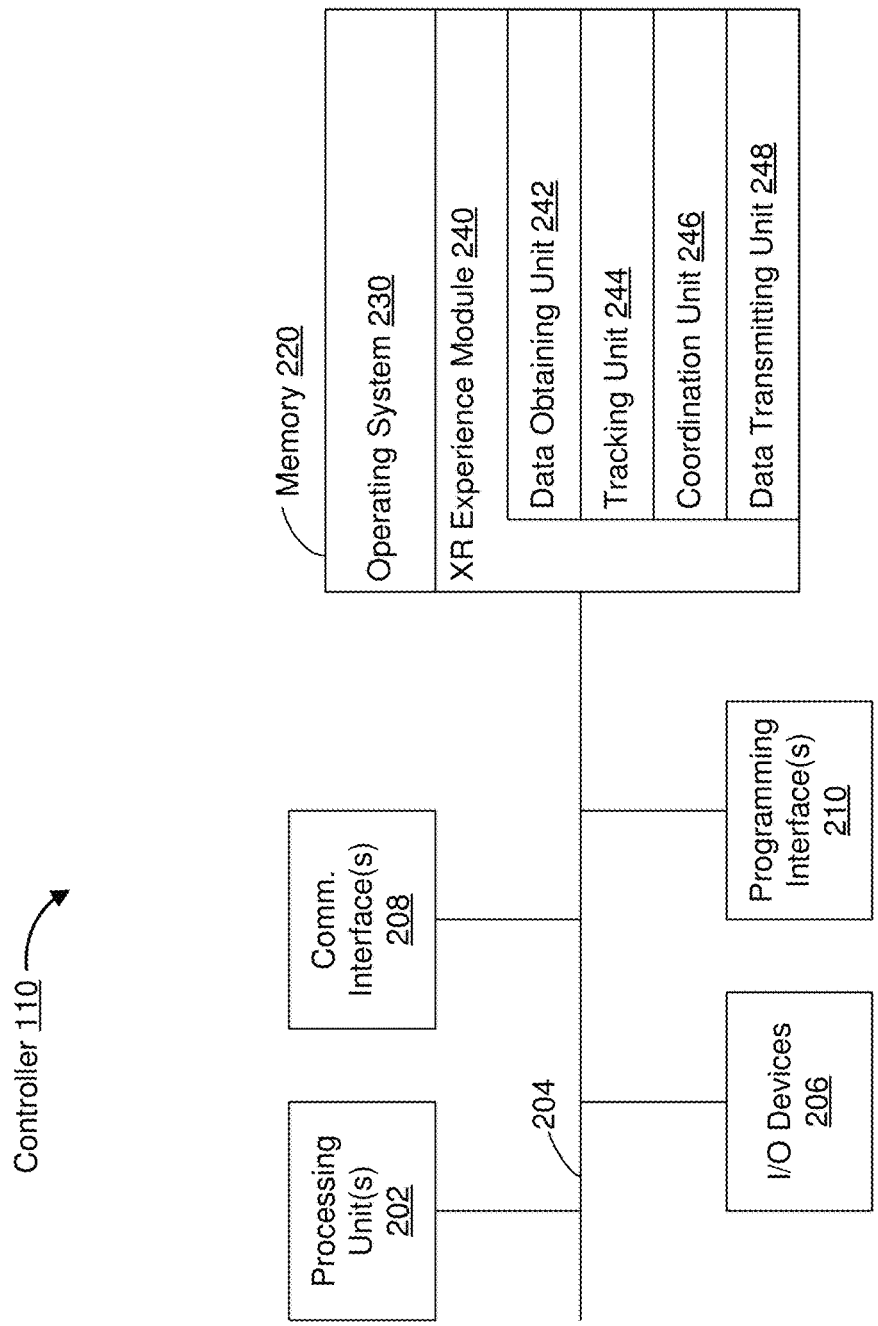
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
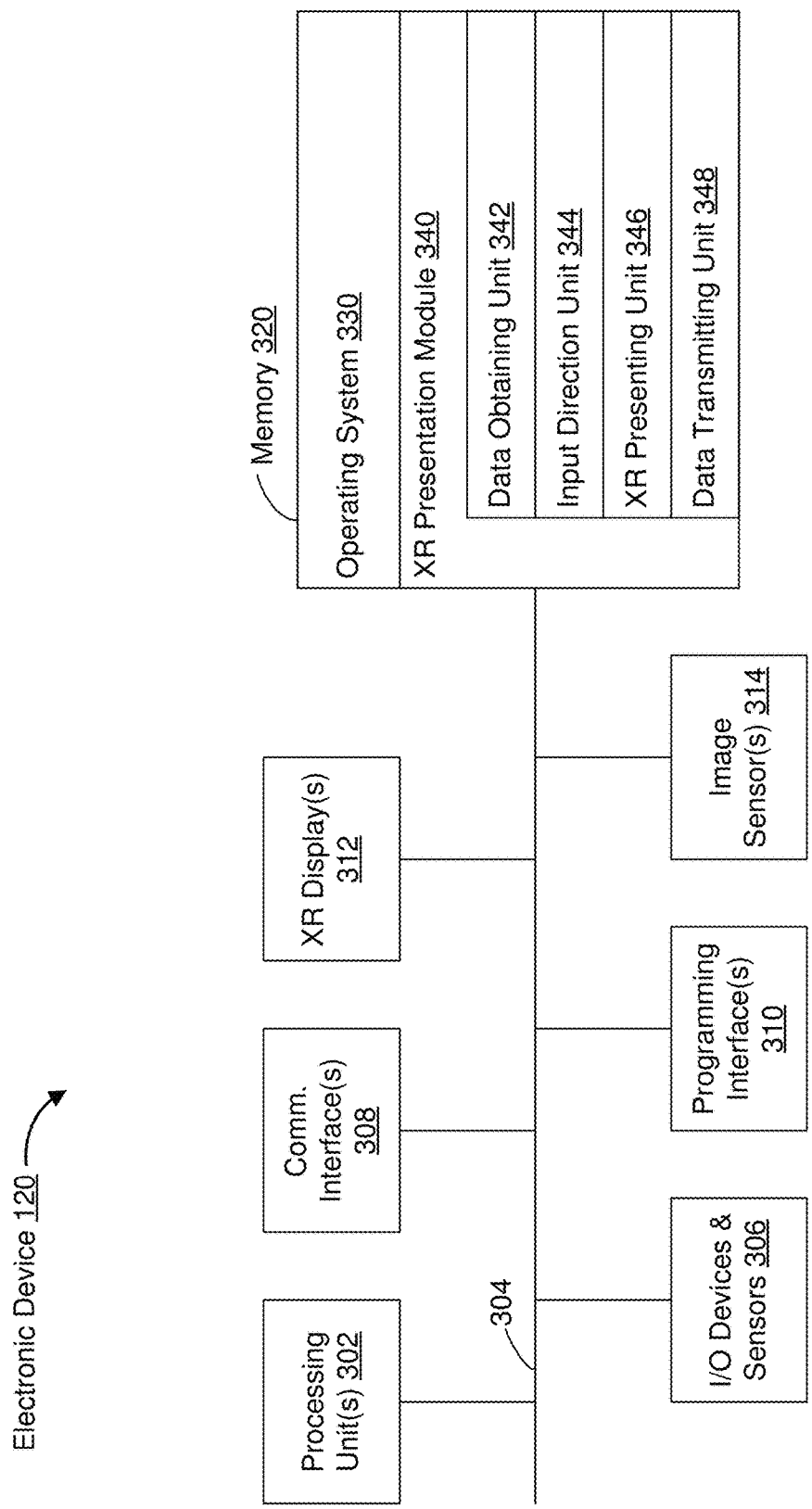
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an input direction unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the input direction unit 344 is configured to direct user input from an input device of the one or more I/O devices and sensors 306 to the XR presenting unit 346 (e.g., to update the one or more XR displays 312) or the data transmitting unit 348 (e.g., to update a display of another electronic device). To that end, in various implementations, the input direction unit 344 includes instructions and/or logic therefor, and heuristics and metadata therefor.

In some implementations, the XR presenting unit 346 is configured to present XR content via the one or more XR displays 312, such as a representation of the selected text input field at a location proximate to the text input device. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the input direction unit 344, the XR presenting unit 346, and the data transmitting unit 348 are shown as residing on a single device (e.g., the electronic device 120), it should be understood that in other implementations, any combination of the data obtaining unit 342, the input direction unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4F illustrate a first XR environment 400 including a physical trackpad 430. FIGS. 4A-4F illustrate the first XR environment 400 from the perspective of a user of an electronic device and displayed, at least in part, by a display of the electronic device. In various implementations, the perspective of the user is from a location of an image sensor of the electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the first XR environment 400 is a virtual environment and the perspective of the user is from the location of an avatar or other representation of the user directed towards the virtual environment.

FIGS. 4A-4F illustrate the first XR environment 400 during a series of time periods. In various implementations, each time period is an instant, a fraction of a second, a few a few seconds, a few hours, a few days, or any length of time.

The first XR environment 400 includes a plurality of objects, including one or more physical objects (e.g., a table 413 and the physical trackpad 430) and one or more virtual objects (e.g., a first virtual display 411, a second virtual display 412, and a device status indicator 490). In various implementations, certain objects (such as the physical objects 413 and 430 and the virtual displays 411 and 412) are displayed at a location in the first XR environment 400, e.g., at a location defined by three coordinates in a three-dimensional (3D) XR coordinate system. Accordingly, when the user moves in the first XR environment 400 (e.g., changes either position and/or orientation), the objects are moved on the display of the electronic device, but retain their location in the first XR environment 400. In various implementations, certain virtual objects (such as the device status indicator 490) are displayed at locations on the display such that when the user moves in the first XR environment 400, the objects are stationary on the display on the electronic device. The device status indicator 490 displays information regarding the status of the electronic device, such as the time and/or battery remaining.

Although FIGS. 4A-4F illustrate two virtual displays 411 and 412 and a physical trackpad 430, in various implementations, either or both of the virtual displays 411 and 412 are physical displays and/or the physical trackpad 430 is a virtual trackpad.

FIGS. 4A-4F illustrate a fingertip 499 of a user at various locations proximate to the physical trackpad 430. For ease of illustration, other portions of the user (such as the rest of the finger or hand of the user) are not illustrated. Further, for ease of illustration, a shadow of the fingertip 499 is displayed at a location below the fingertip 499 to illustrate the difference between the fingertip 499 hovering over the physical trackpad 430 and contacting the physical trackpad 430.

Figure 4A:
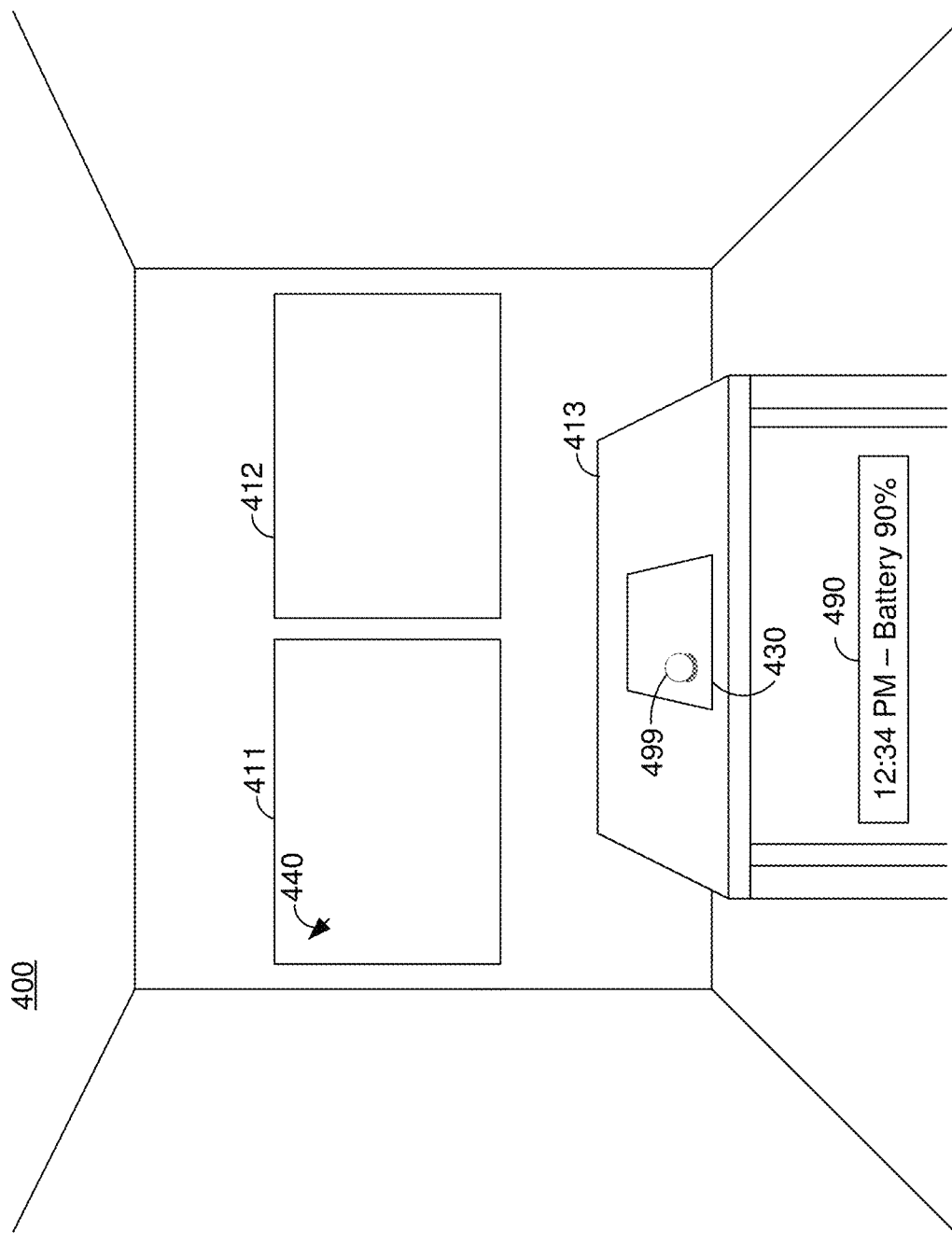
FIGS. 4A-4F illustrate a first XR environment including a physical trackpad.

FIG. 4A illustrates the first XR environment 400 during a first time period. During the first time period, the fingertip 499 is contacting a lower-left corner of the physical trackpad 430. During the first time period, the first virtual display 411 includes a cursor 440 displayed in an upper-left corner of the first virtual display 411.

Figure 4B:
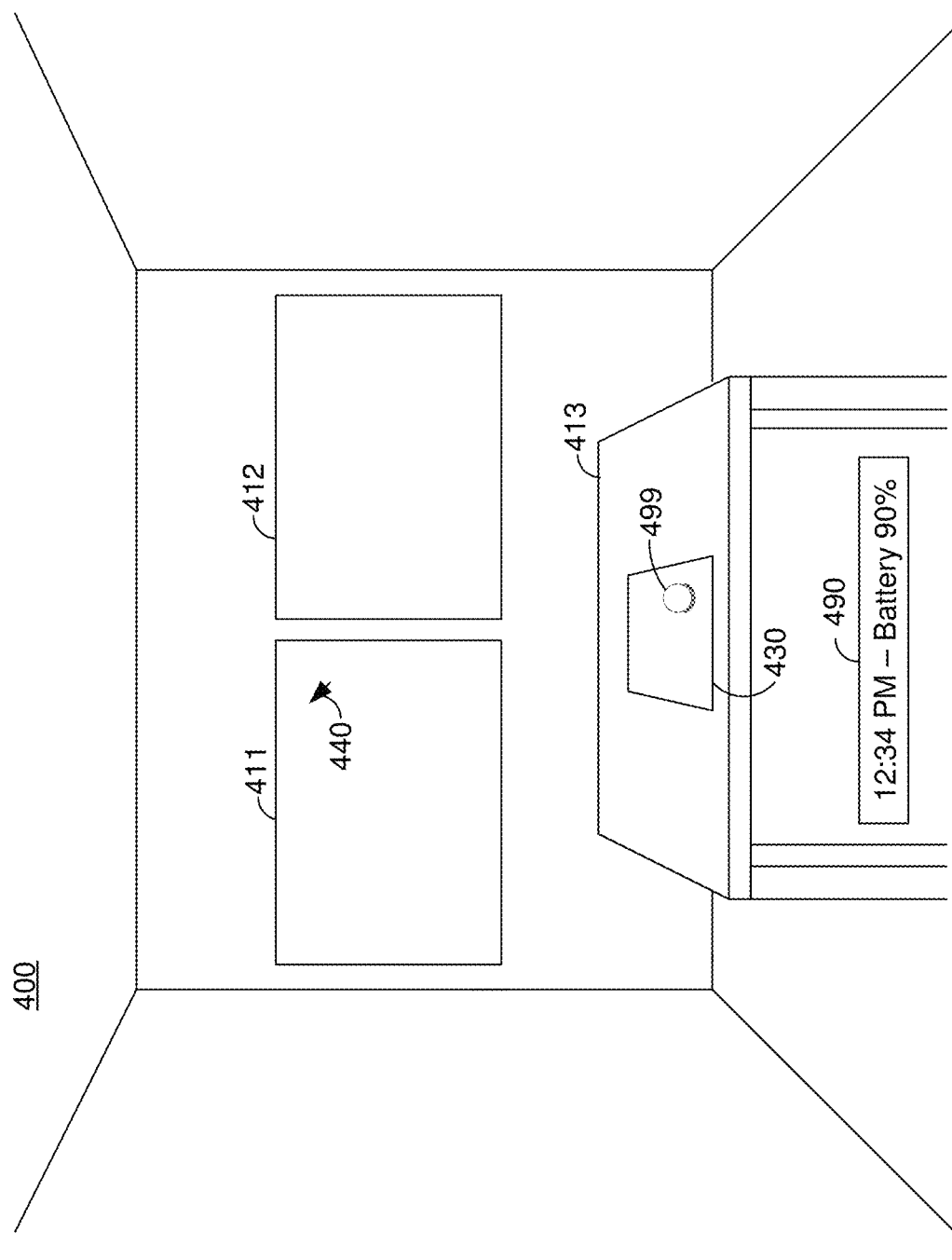

FIG. 4B illustrates the first XR environment 400 during a second time period subsequent to the first time period. During the second time period, as compared to the first time period, the fingertip 499 has moved to the right, contacting the lower-right corner of the physical trackpad 430. In response, the cursor 440 has moved to the right, being displayed in the upper-right corner of the first virtual display 411.

Figure 4C:
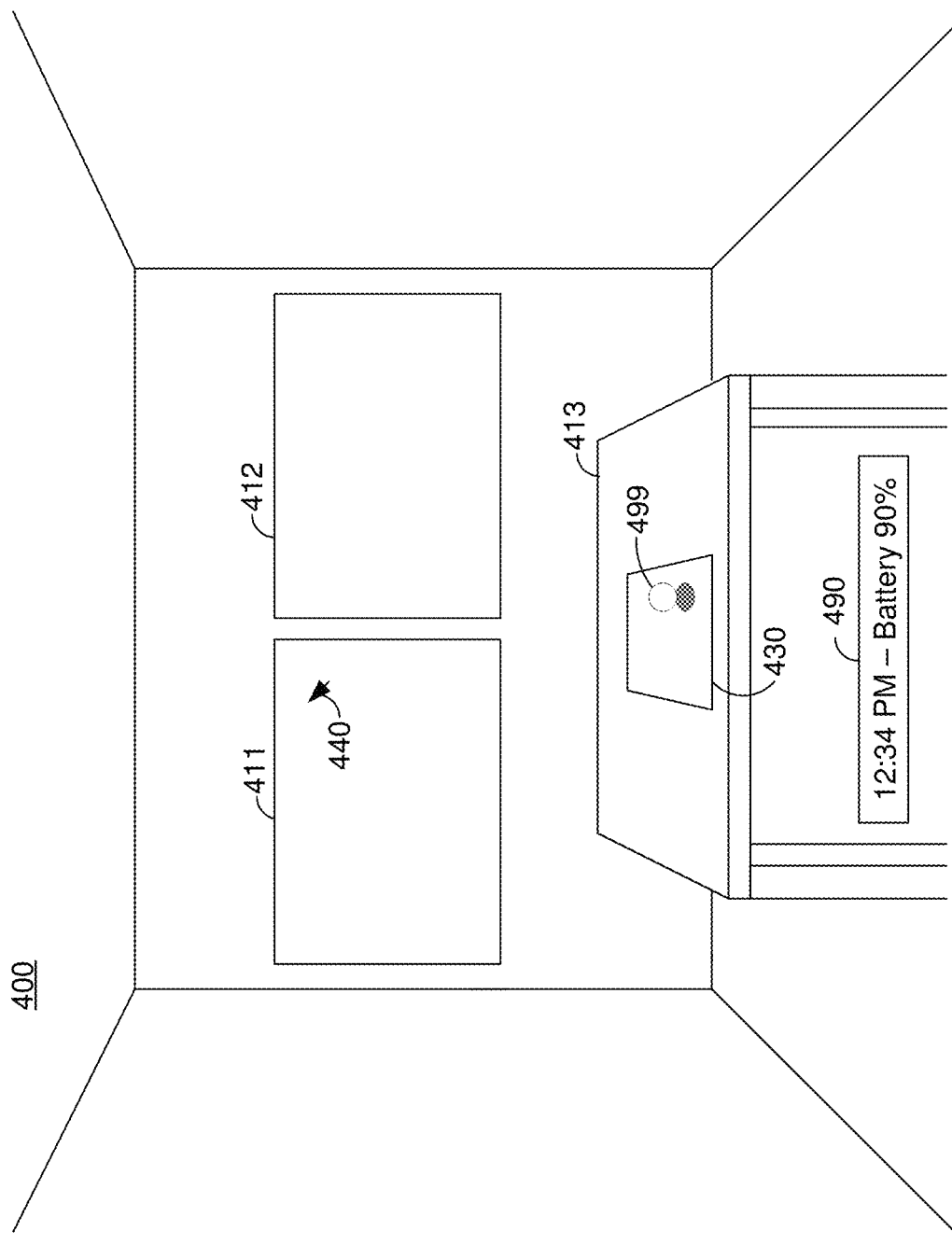

FIG. 4C illustrates the first XR environment 400 during a third time period subsequent to the second time period. During the third time period, as compared to the second time period, the fingertip 499 has lifted and is hovering over the lower-right corner of the physical trackpad 430. During the third time period, the cursor 440 remains displayed in the upper-right corner of the first virtual display 411.

Figure 4D:
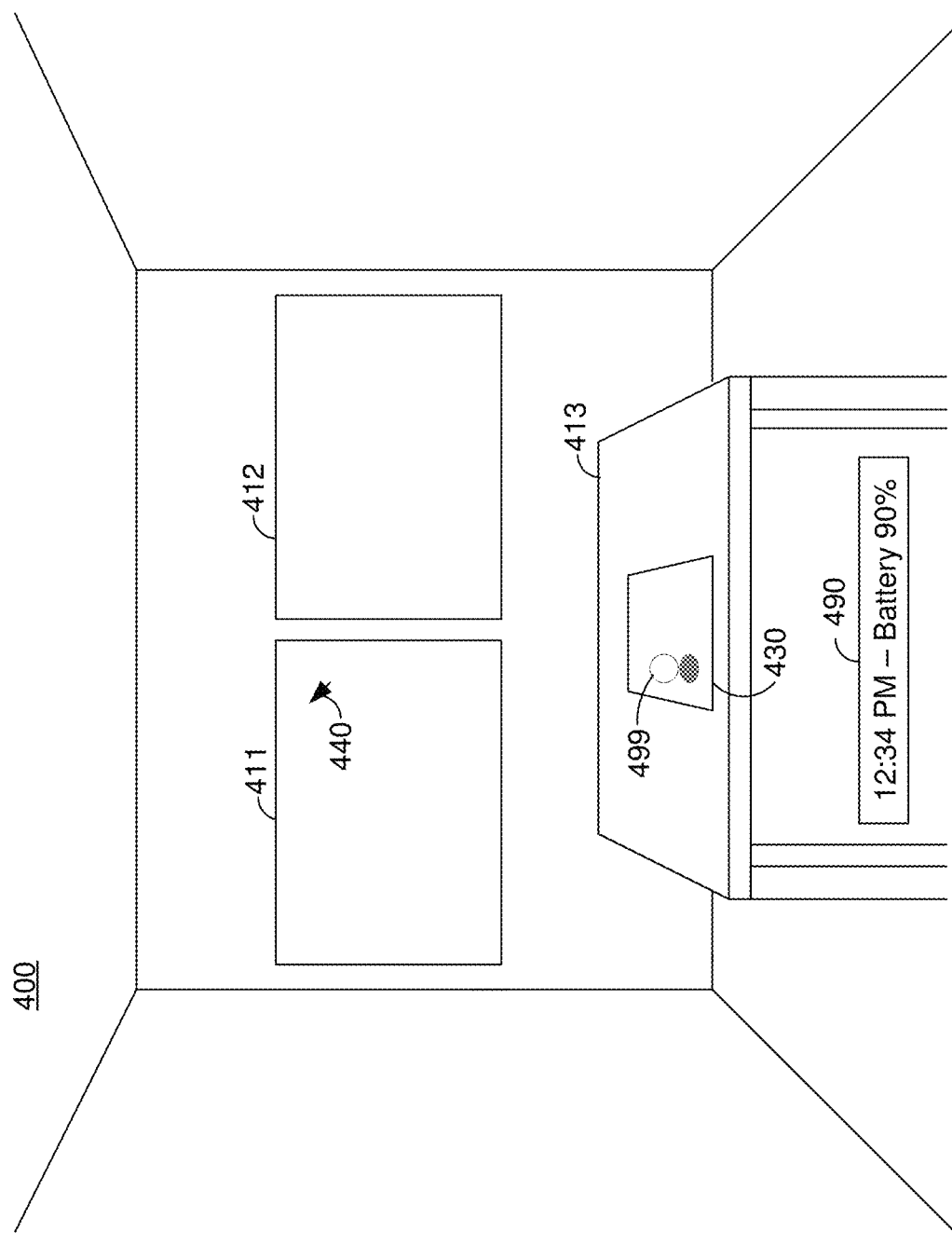

FIG. 4D illustrates the first XR environment 400 during a fourth time period subsequent to the third time period. During the fourth time period, as compared to the third time period, the fingertip 499 has moved to the left, hovering over the lower-left corner of the physical trackpad 430. However, because the motion of the fingertip 499 occurred while the fingertip 499 was hovering over and not in contact with the physical trackpad 430, the cursor 440 is unmoved and remains displayed in the upper-right corner of the first virtual display 411.

Figure 4E:
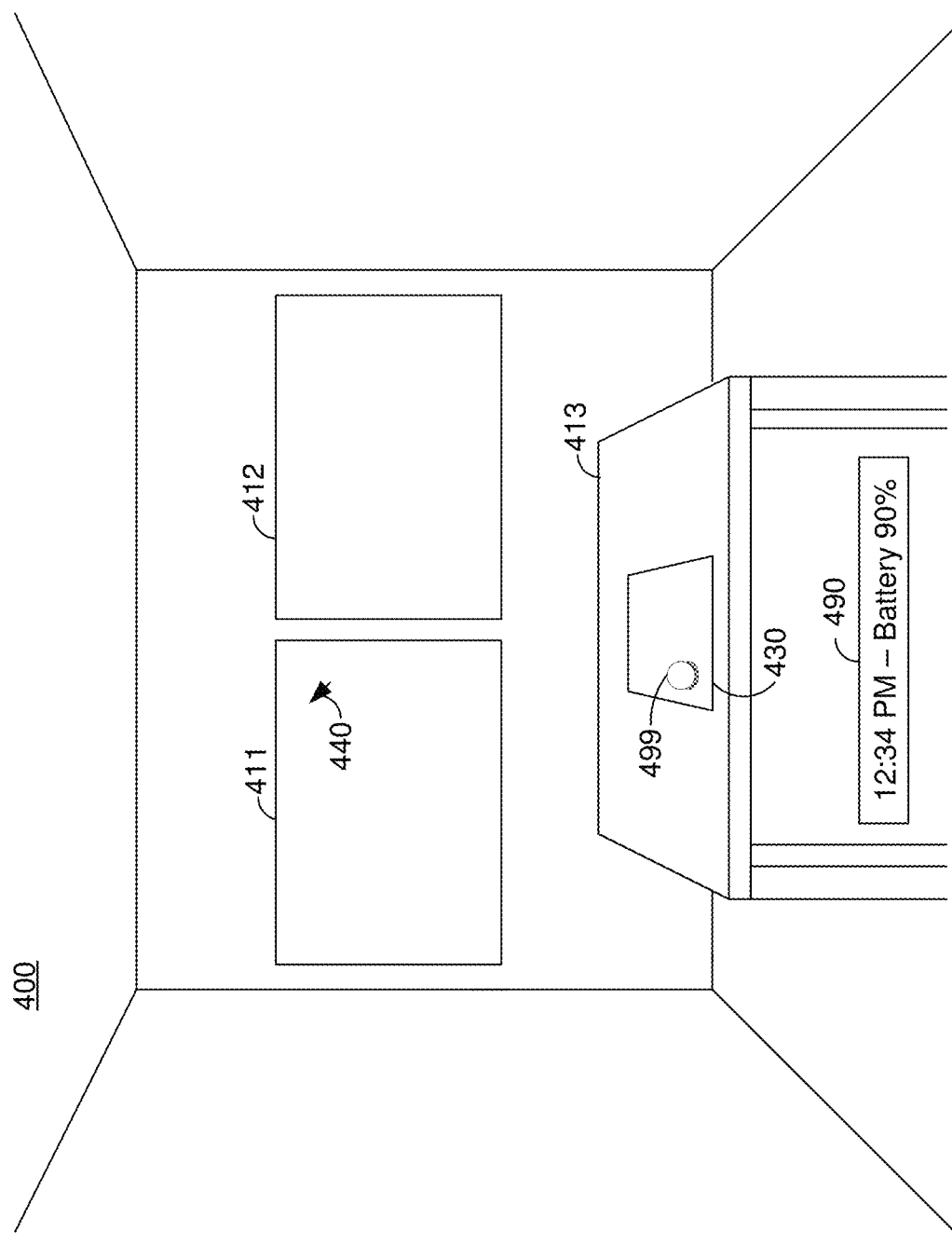

FIG. 4E illustrates the first XR environment 400 during a fifth time period subsequent to the fourth time period. During the fifth time period, as compared to the fourth time period, the fingertip 499 has dropped and is contacting the lower-left corner of the physical trackpad 430. During the fifth time period, the cursor 440 remains displayed in the upper-right corner of the first virtual display 411.

Figure 4F:
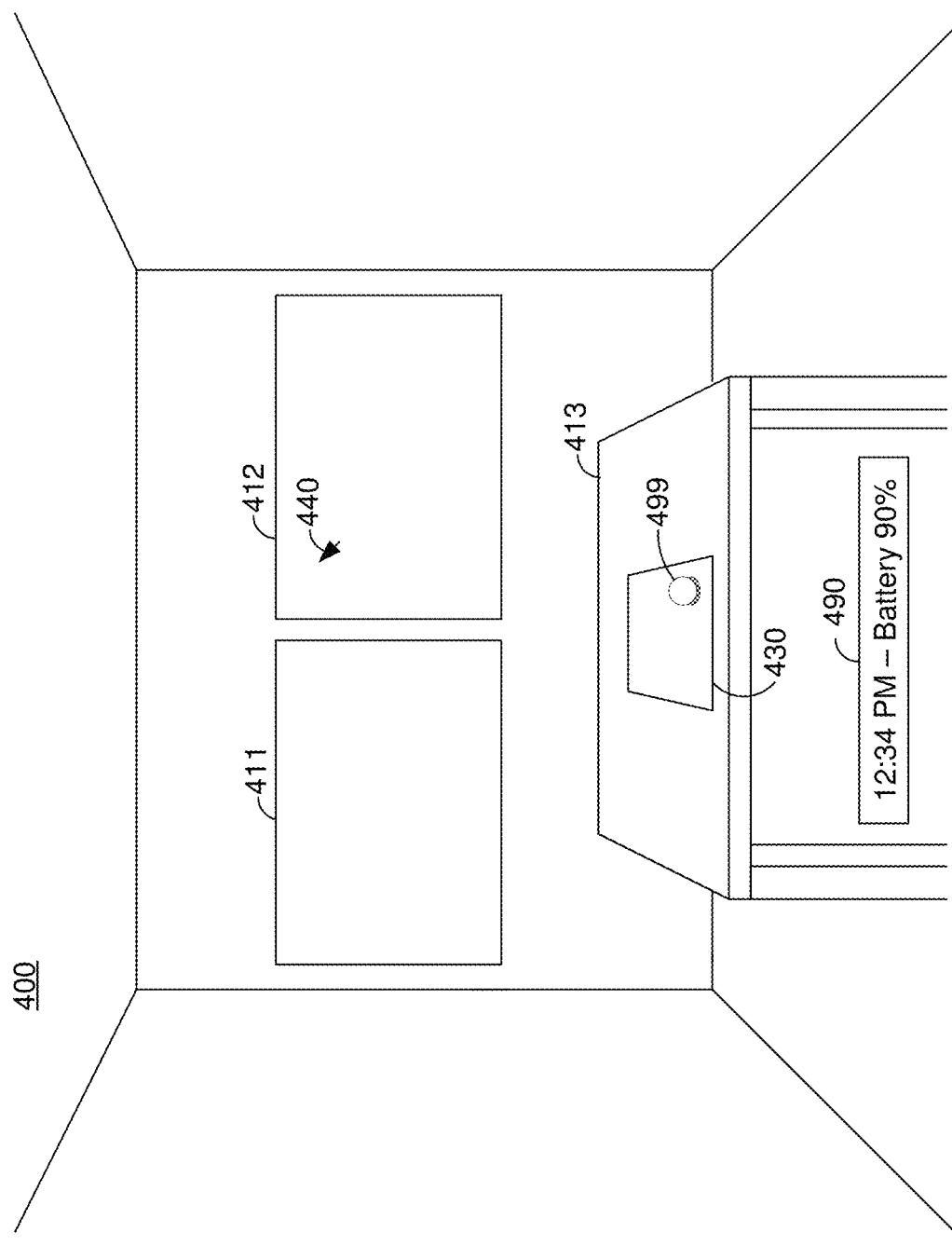

FIG. 4F illustrates the first XR environment 400 during a sixth time period subsequent to the fifth time period. During the sixth time period, as compared to the fifth time period, the fingertip 499 has moved to the right, contacting the lower-right corner of the physical trackpad 430. In response, the cursor 440 has moved to the right, being displayed in the upper-left corner of the second virtual display 412. Accordingly, in various implementations, the cursor 440 moved to the right and, upon reaching the edge of the first virtual display 411, jumped to the proximate edge of the second virtual display 412, and continued to move to the right.

Figure 5B:
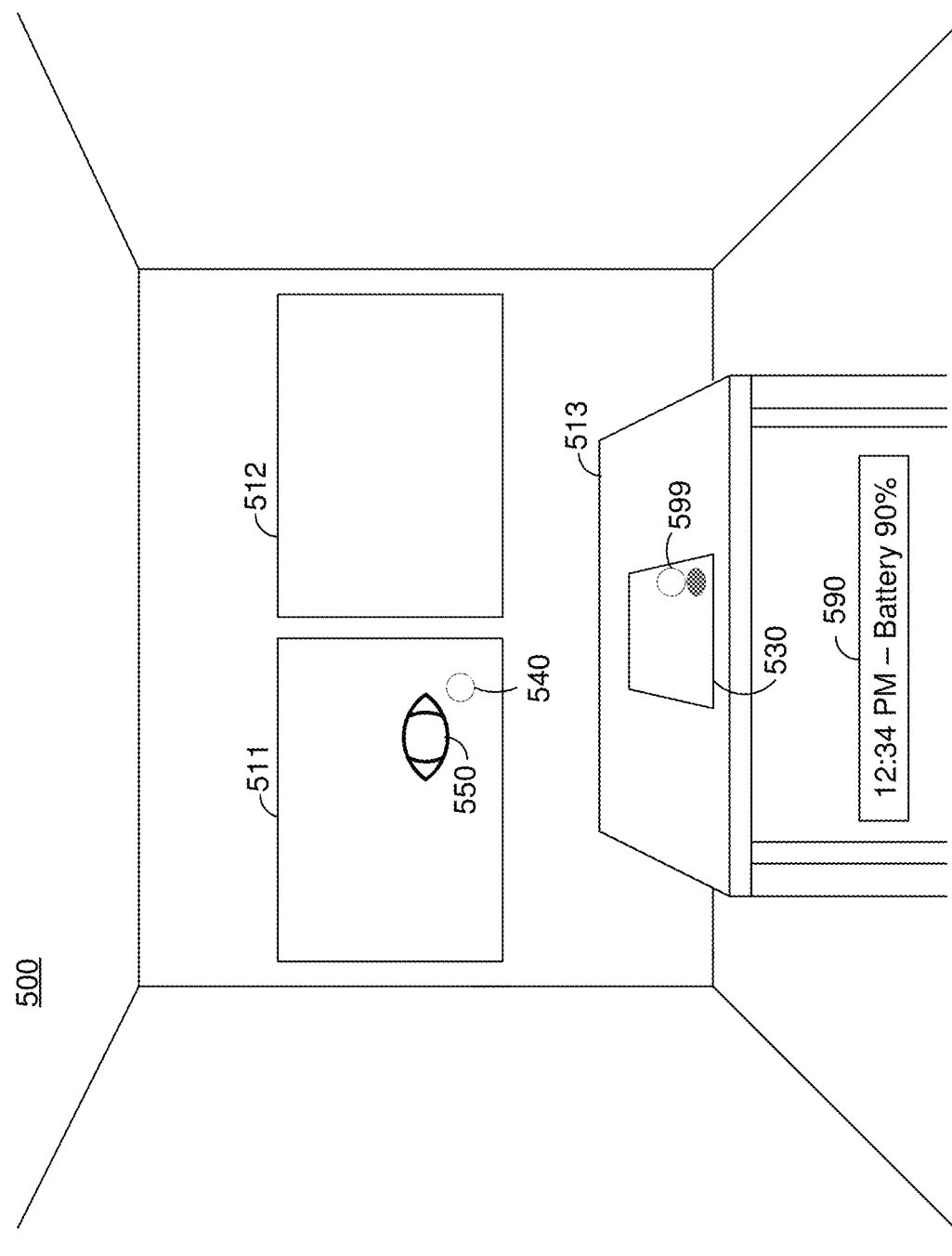
FIGS. 5A-5Q illustrate a second XR environment including a virtual trackpad.
Figure 5C:
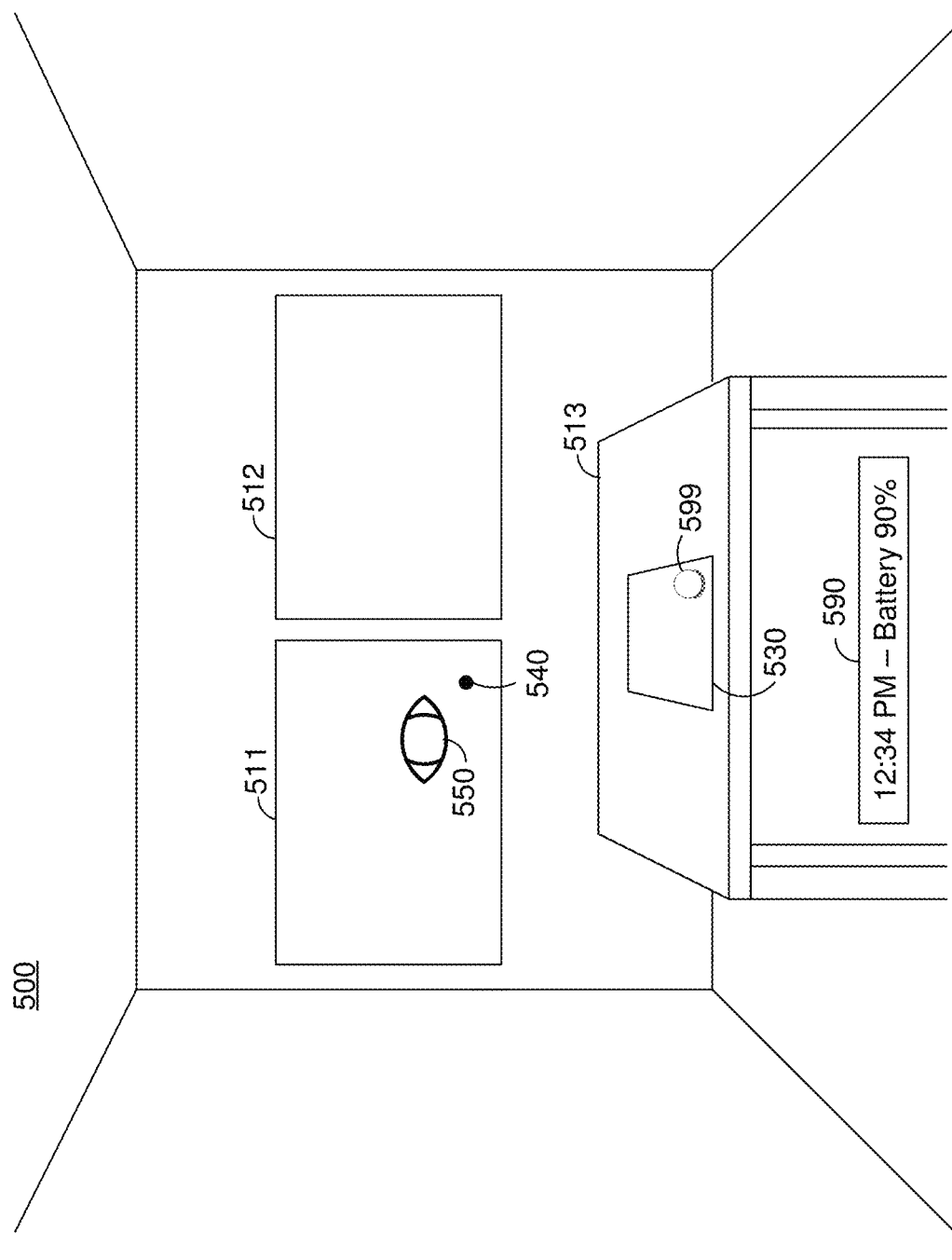
Figure 5D:
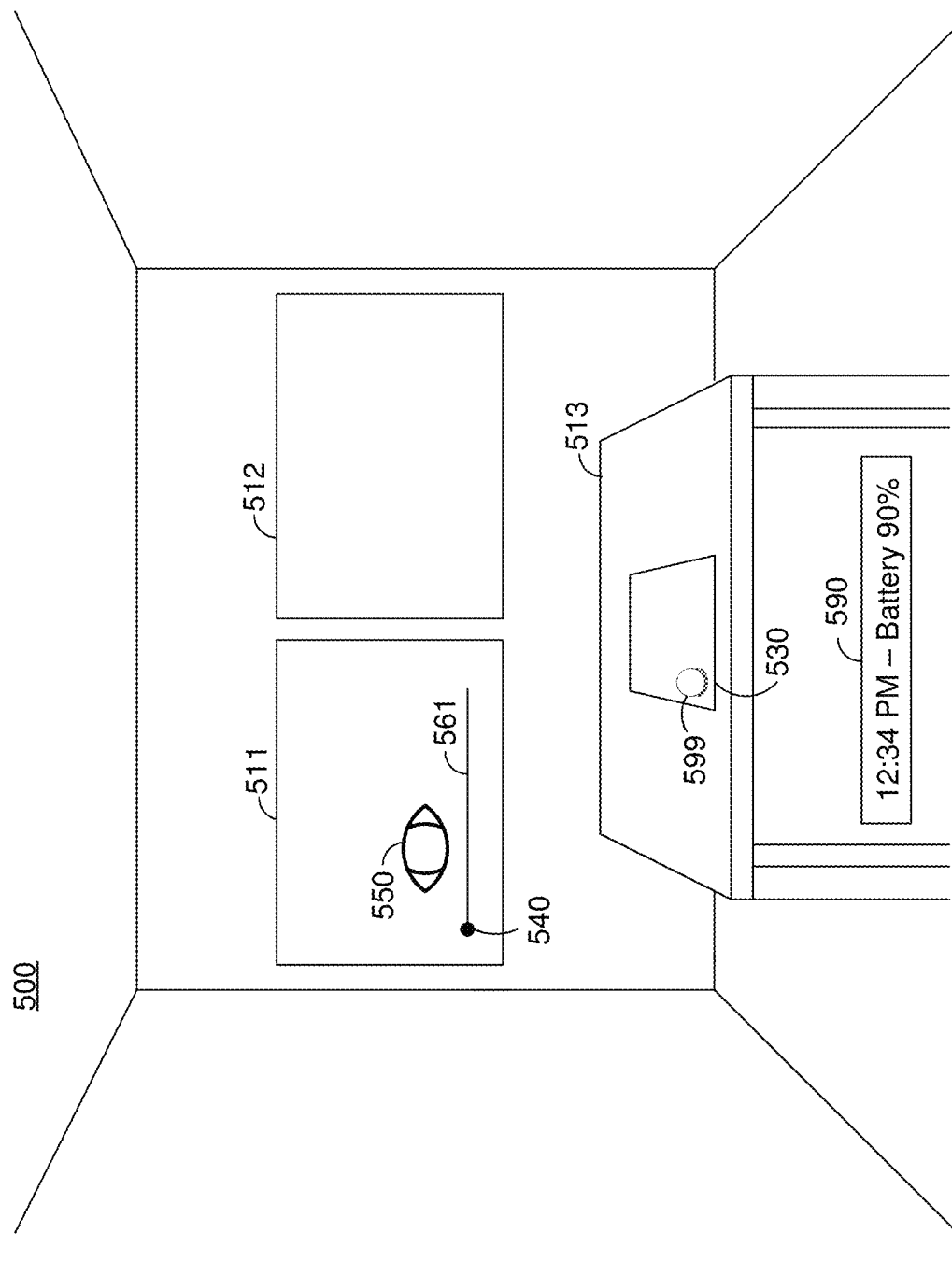
Figure 5E:
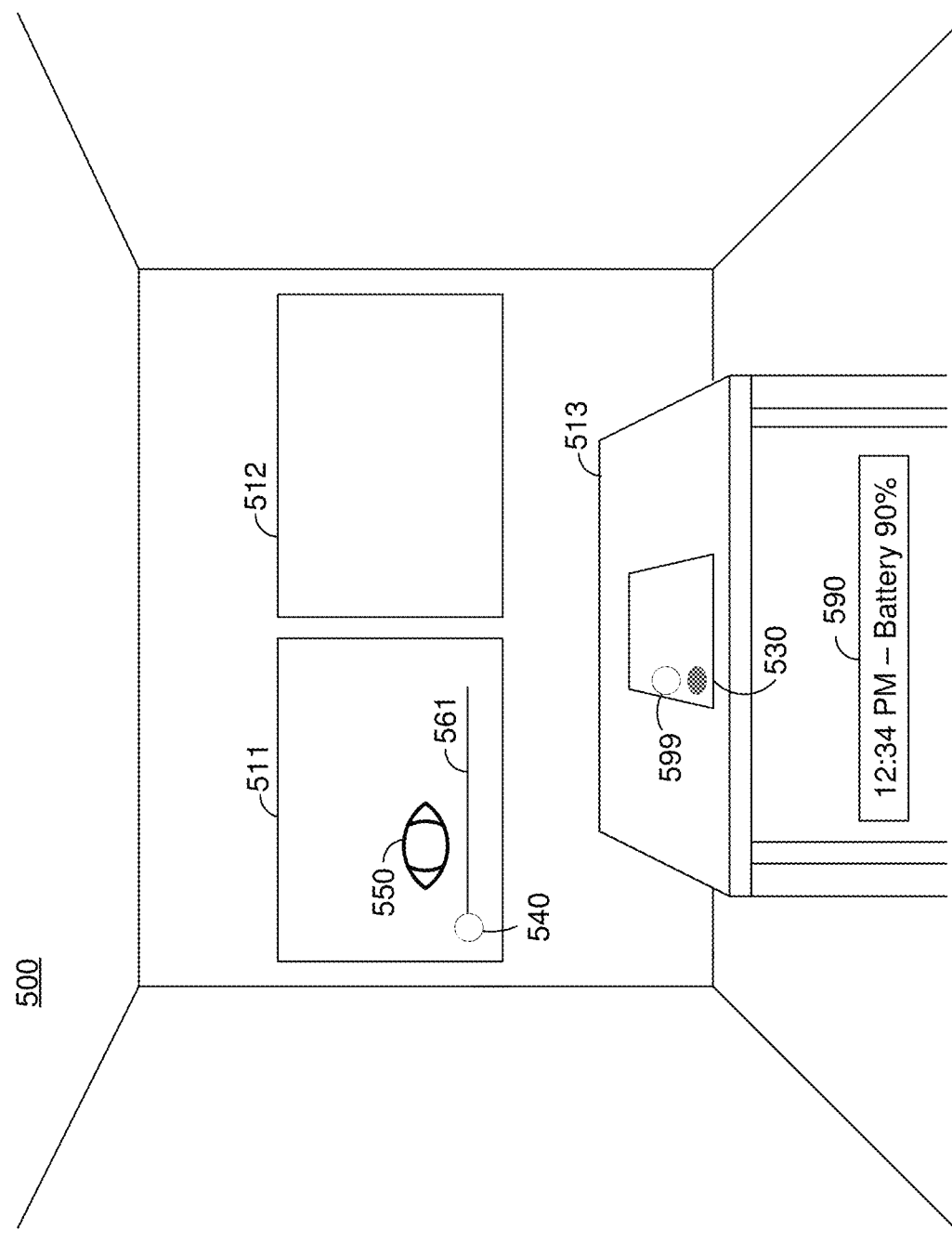
Figure 5F:
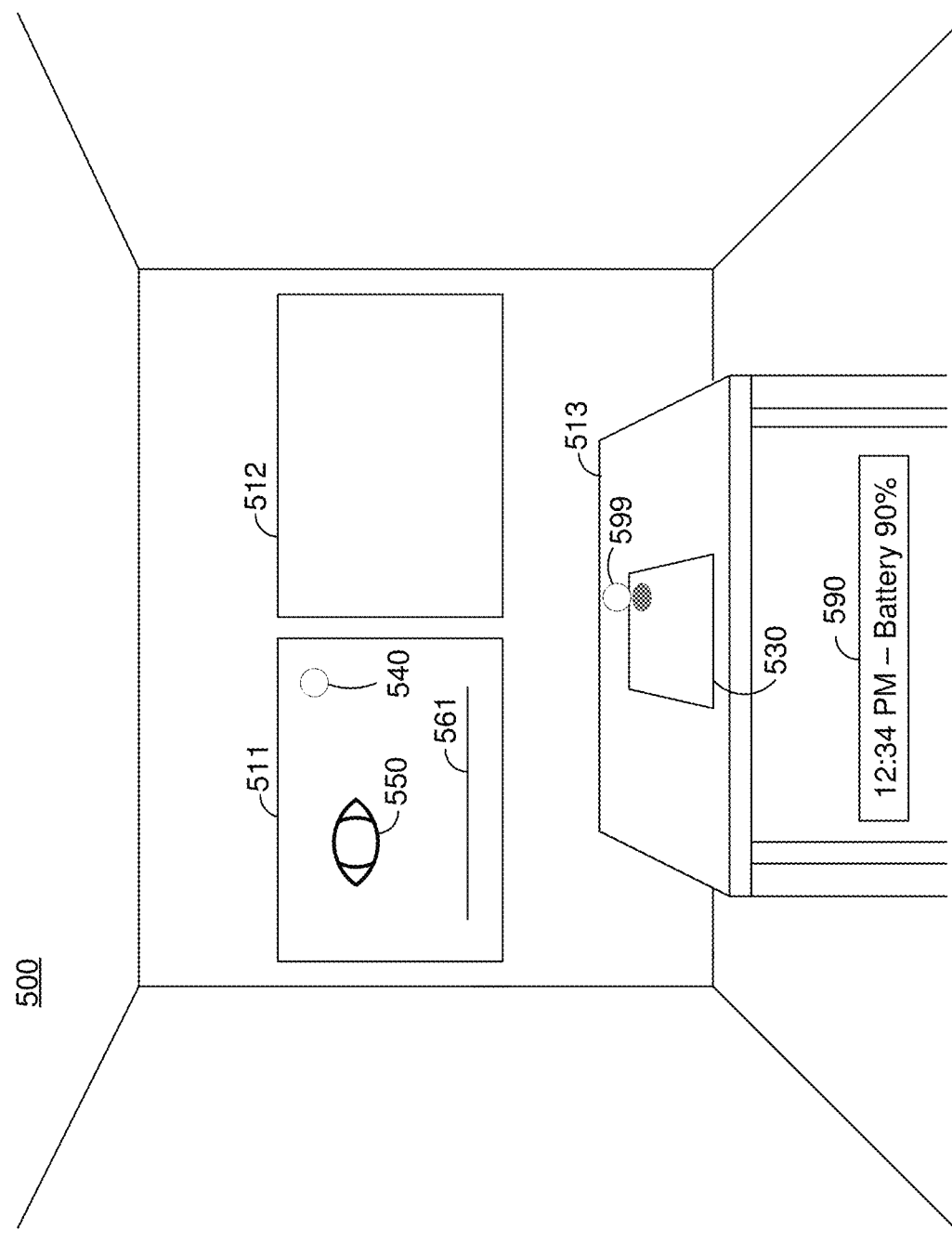
Figure 5G:
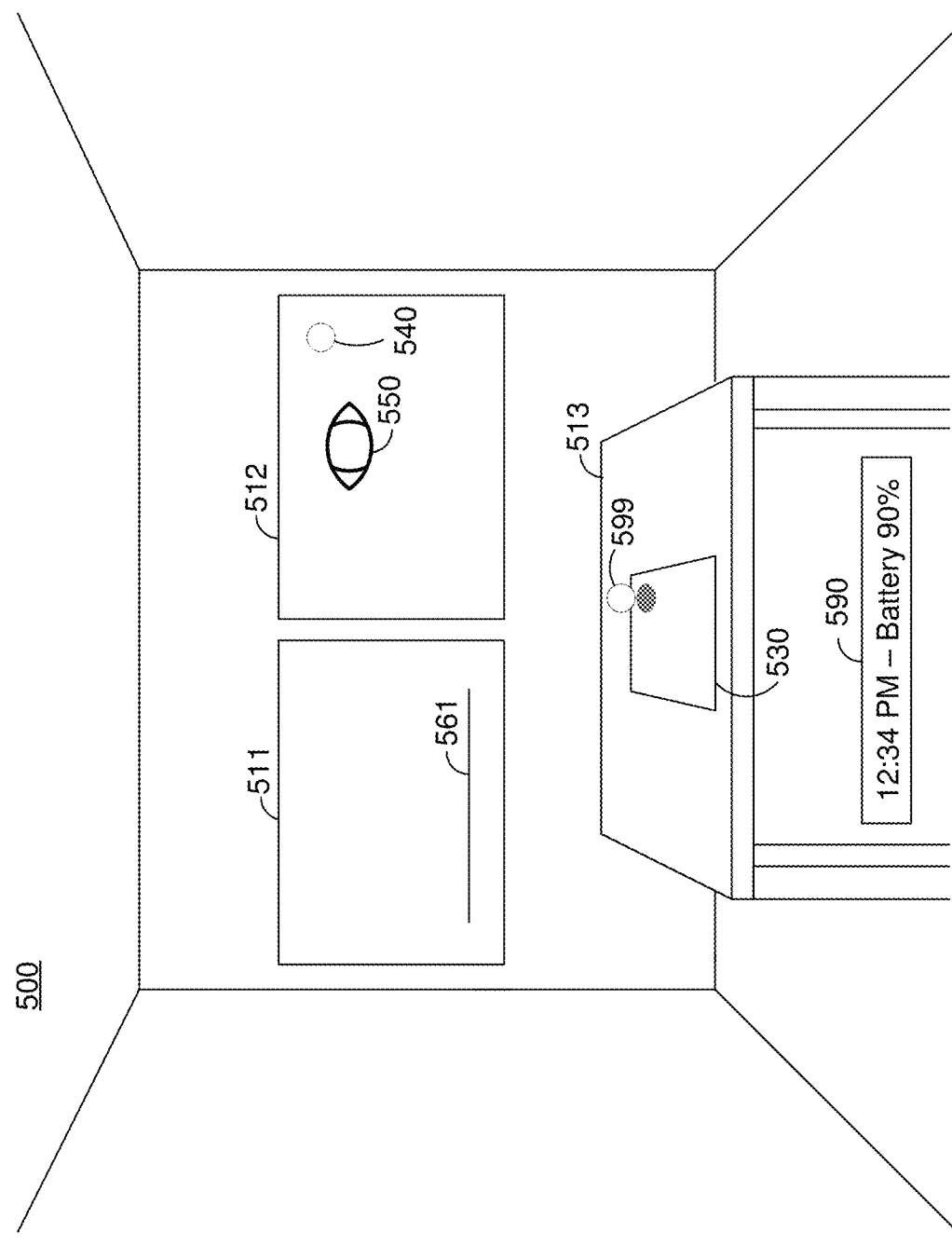
Figure 5H:
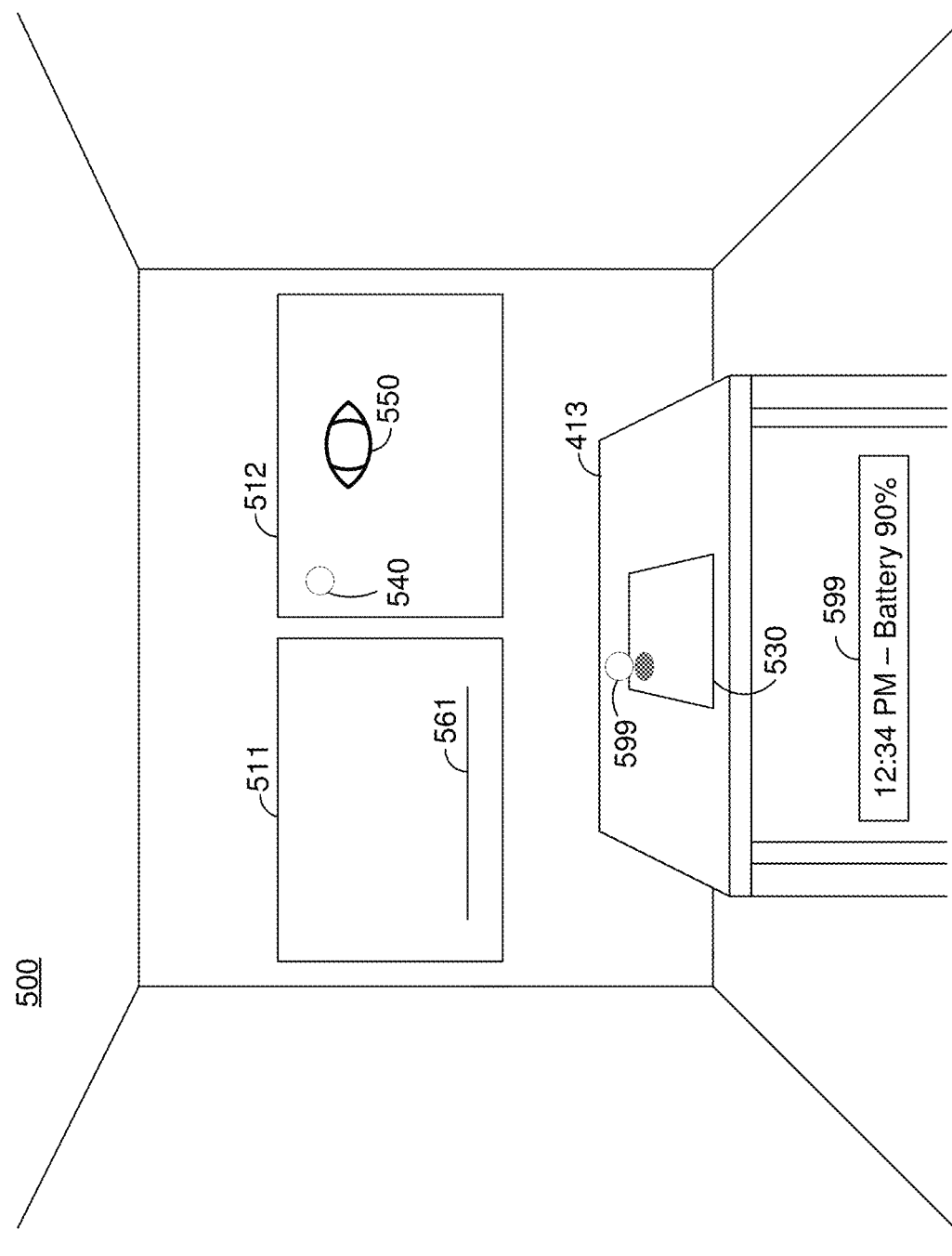
Figure 5J:
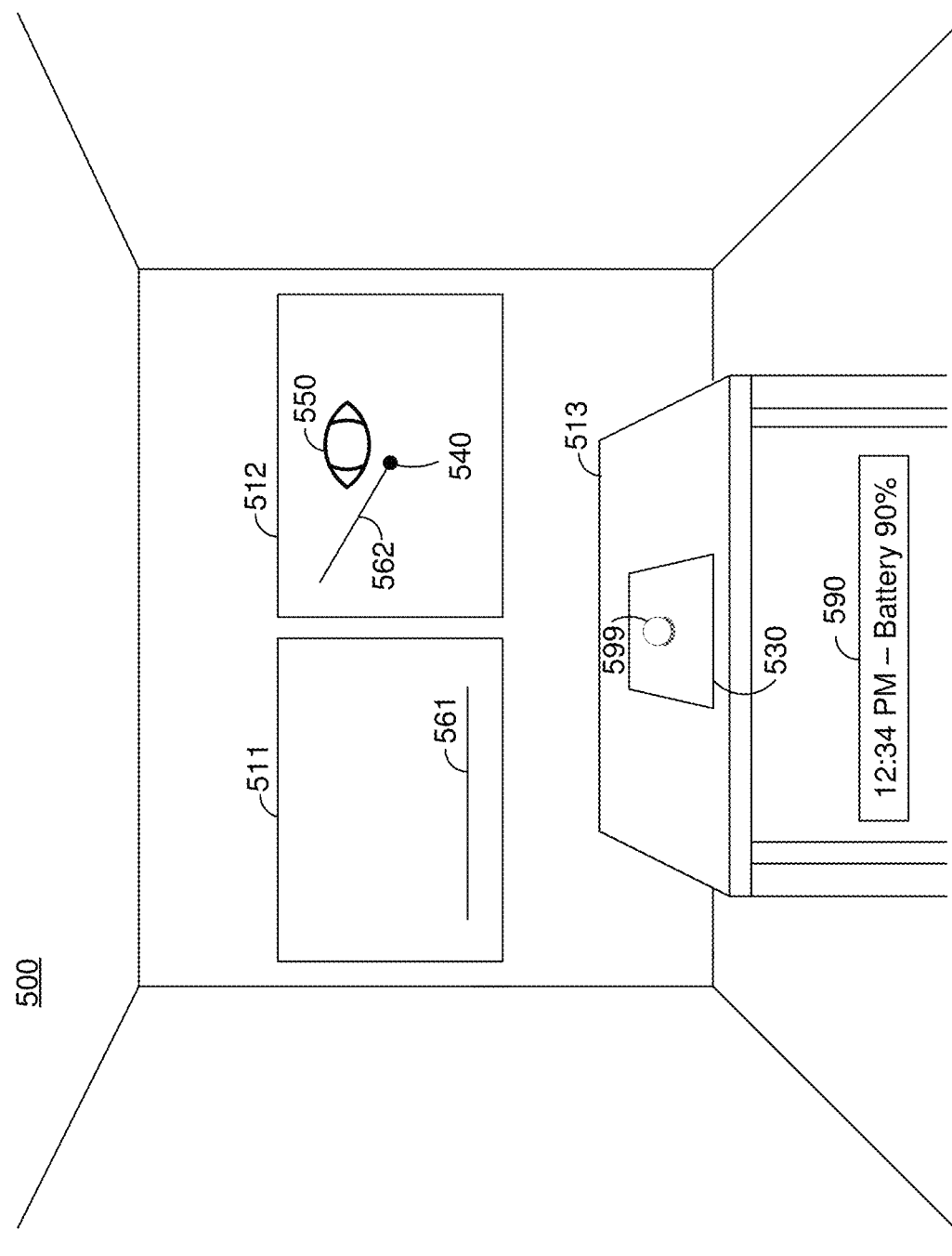
Figure 5K:
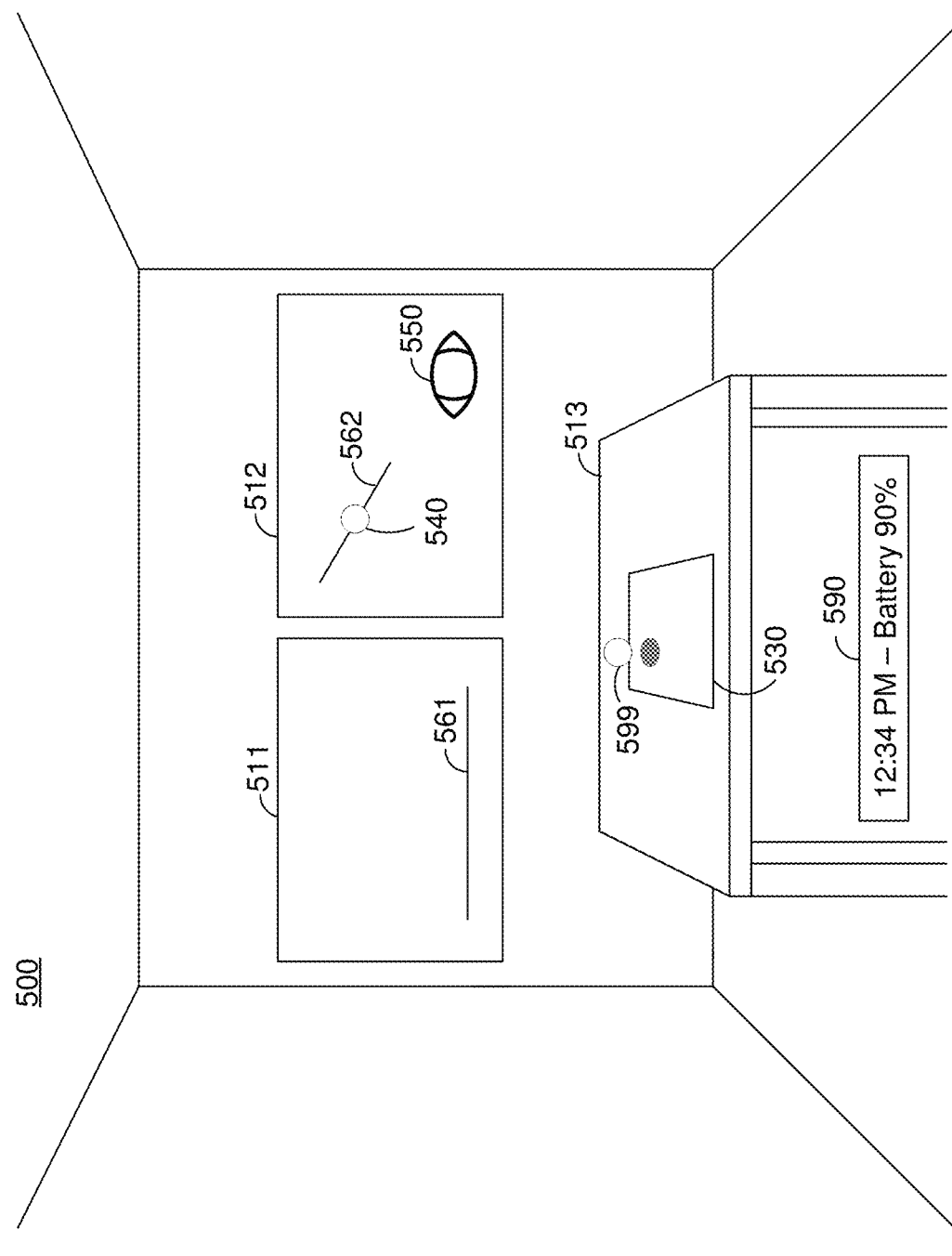
Figure 5L:
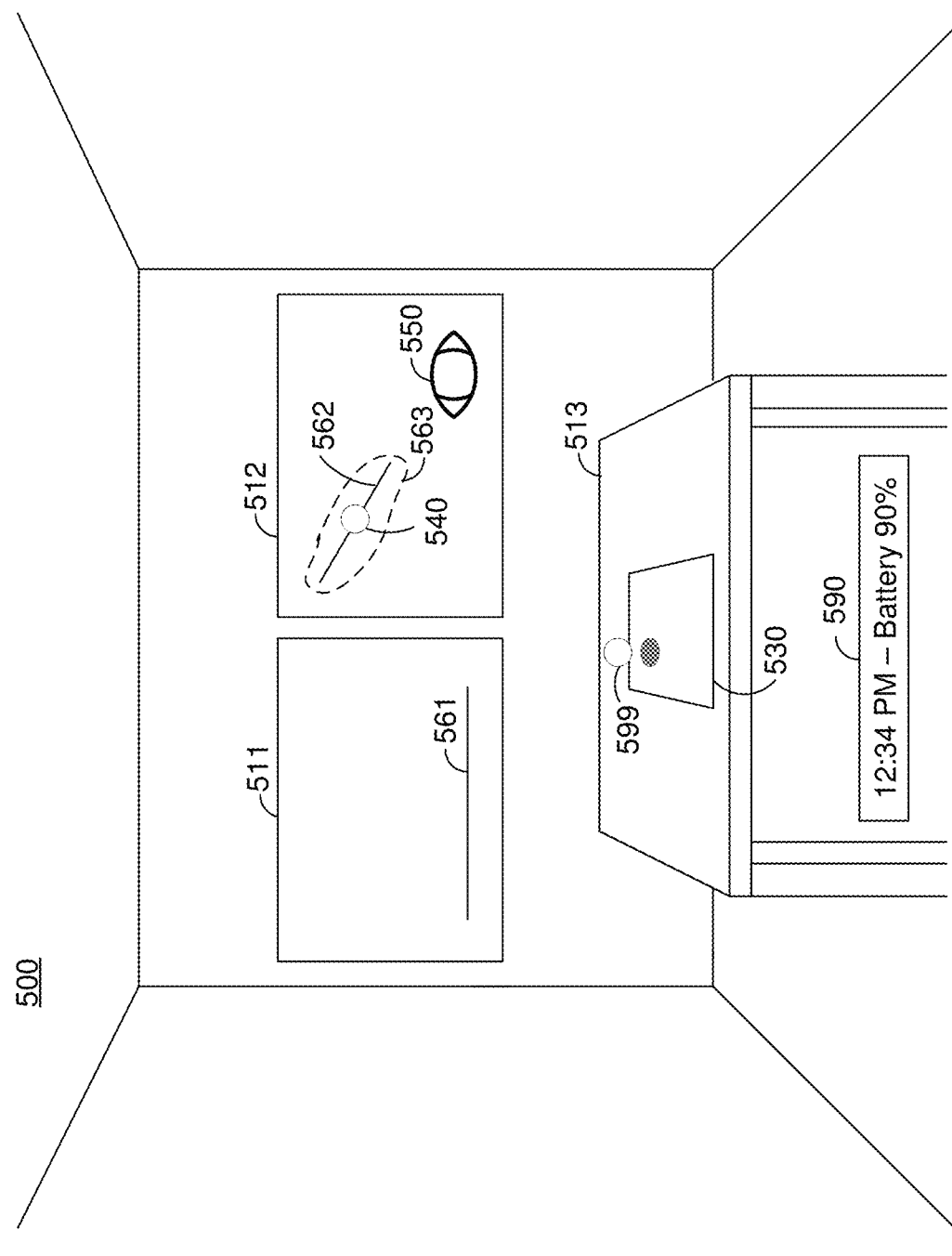
Figure 5M:
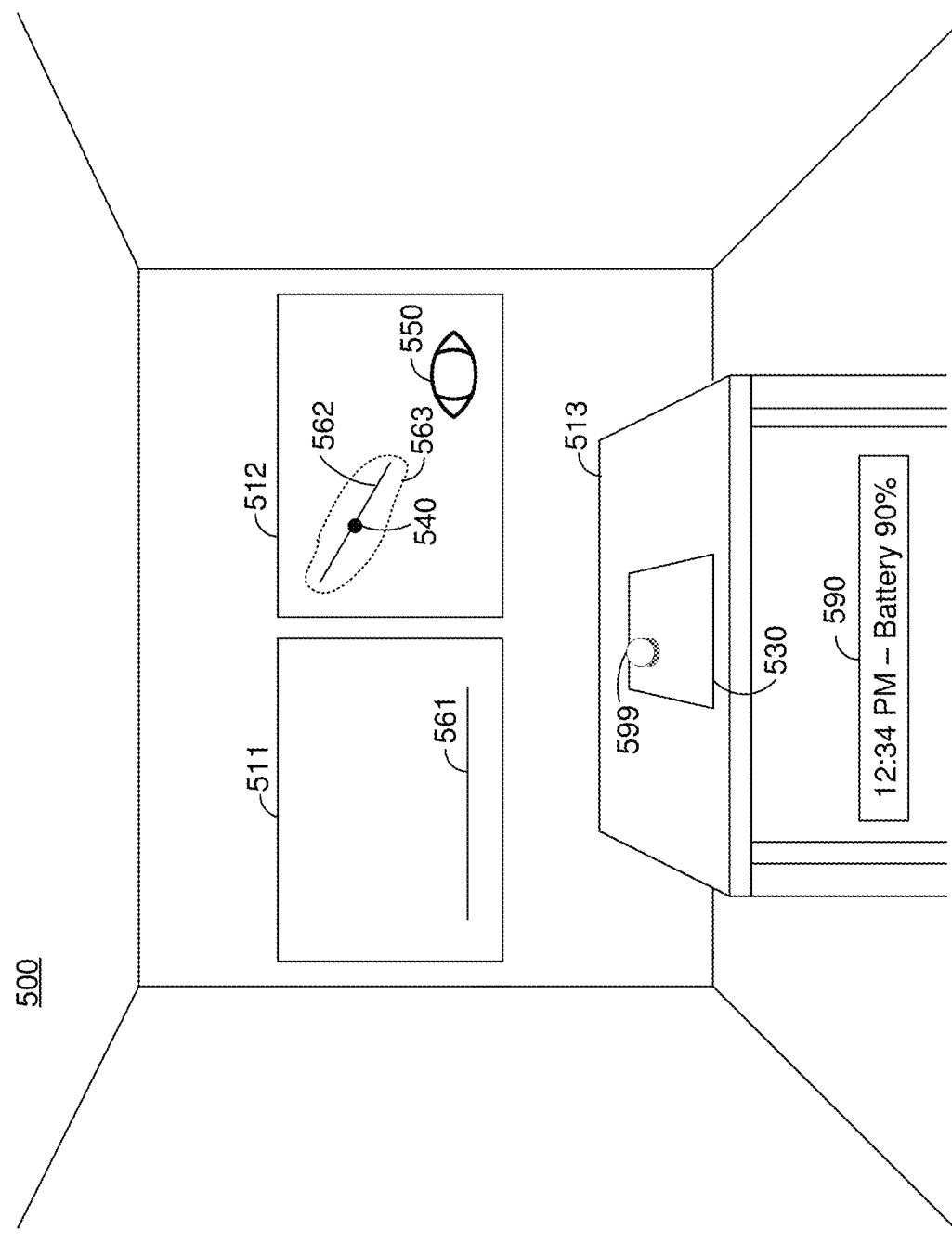
Figure 5N:
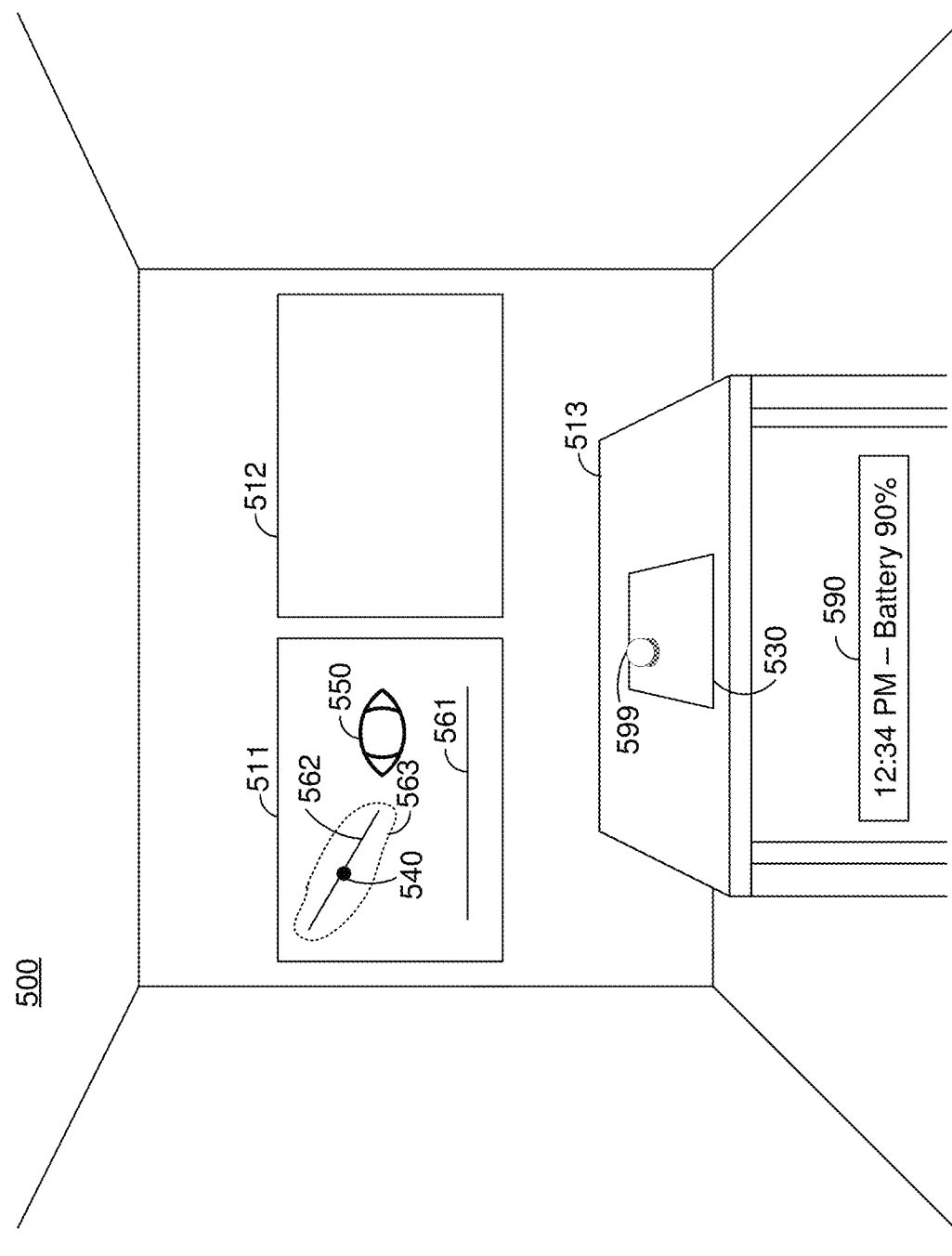
Figure 5O:
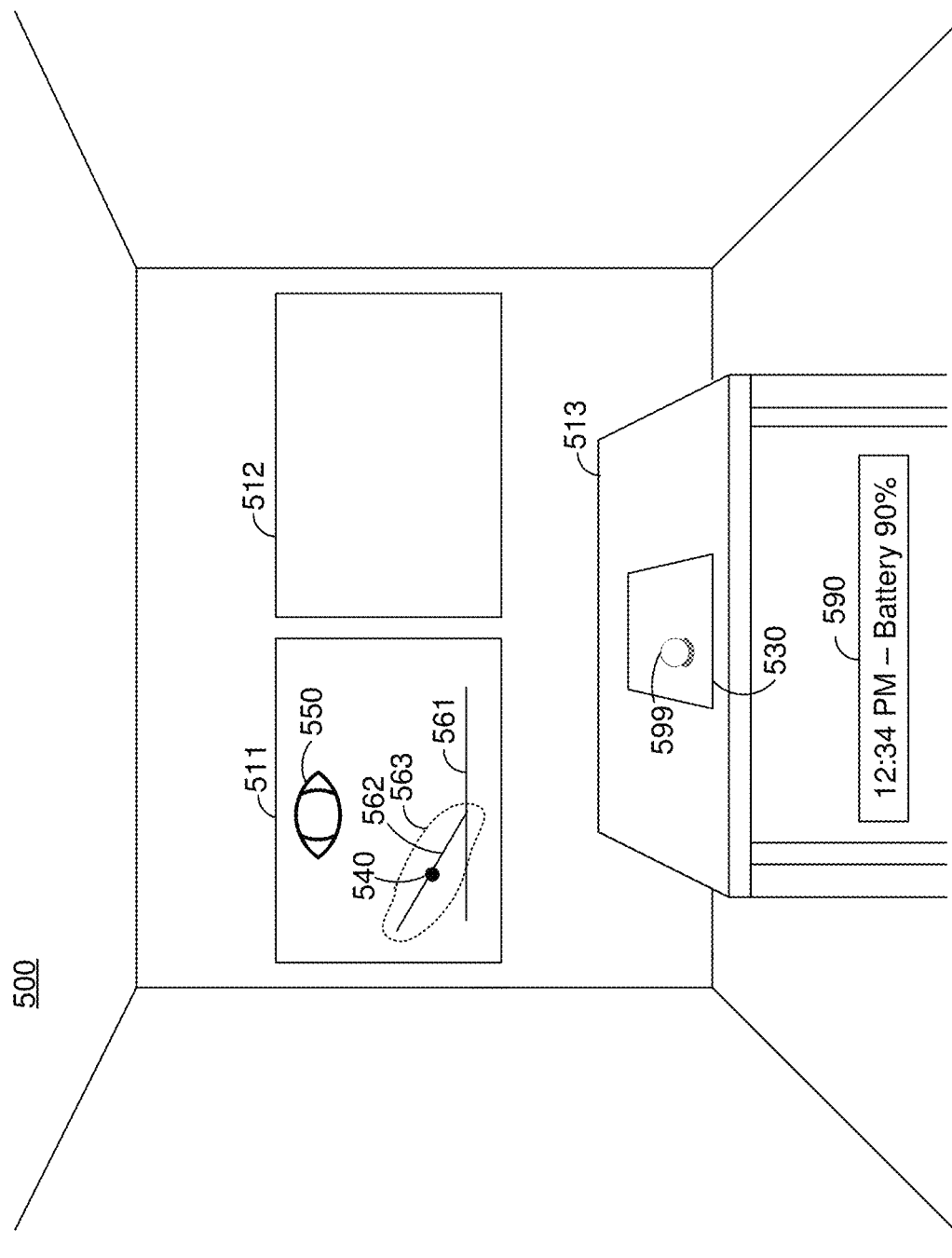
Figure 5P:
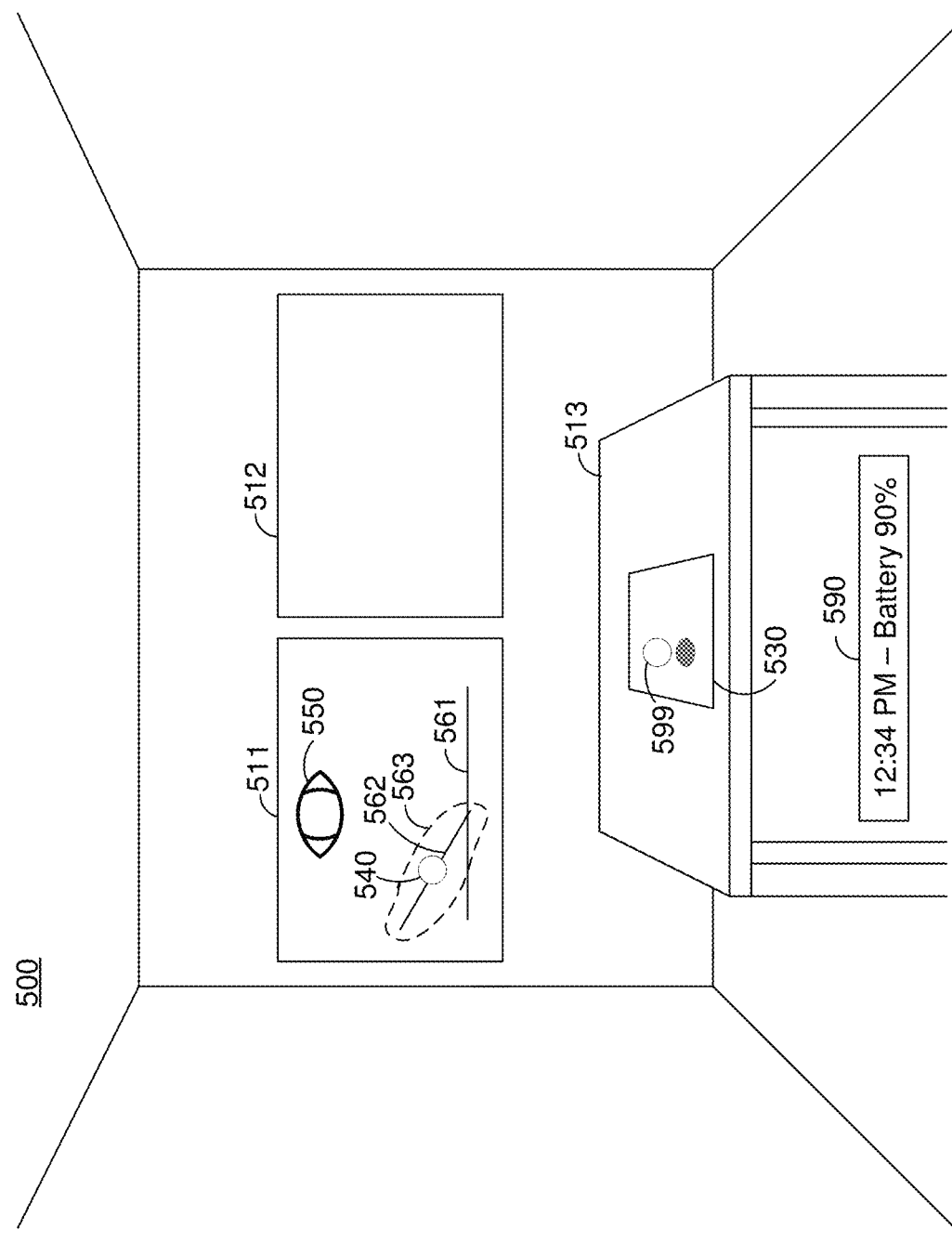
Figure 5Q:
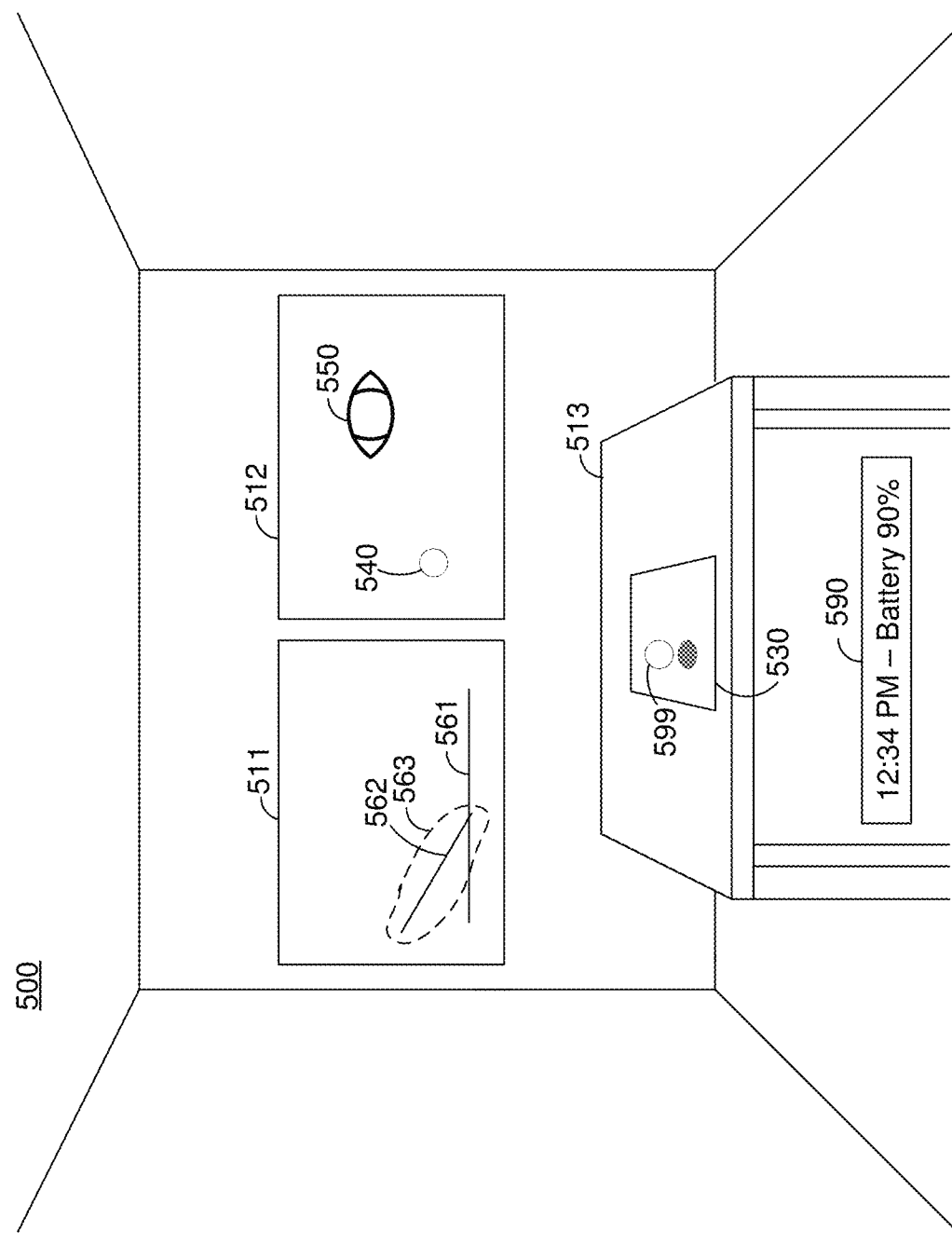

FIGS. 5A-5Q illustrate a second XR environment 500 including a virtual trackpad 530. FIGS. 5A-5Q illustrate the second XR environment 500 from the perspective of a user of an electronic device and displayed, at least in part, by a display of the electronic device. FIGS. 5A-5Q illustrate the second XR environment 500 during a series of time periods. In various implementations, each time period is an instant, a fraction of a second, a few seconds, a few hours, a few days, or any length of time.

The second XR environment 500 includes a plurality of objects, including one or more physical objects (e.g., a table 513) and one or more virtual objects (e.g., a first virtual display 511, a second virtual display 512, a virtual trackpad 530, and a device status indicator 590). In various implementations, certain objects (such as the physical objects 513, the virtual displays 511 and 512, and the virtual trackpad 530) are displayed at a location in the second XR environment 500, e.g., at a location defined by three coordinates in a three-dimensional (3D) XR coordinate system. Accordingly, when the user moves in the second XR environment 500 (e.g., changes either position and/or orientation), the objects are moved on the display of the electronic device, but retain their location in the second XR environment 500. In various implementations, certain virtual objects (such as the device status indicator 590) are displayed at locations on the display such that when the user moves in the second XR environment 500, the objects are stationary on the display on the electronic device. The device status indicator 590 displays information regarding the status of the electronic device, such as the time and/or battery remaining.

Although FIGS. 5A-5Q illustrate two virtual displays 511 and 512 and a virtual trackpad 530, in various implementations, either or both of the virtual displays 511 and 512 are physical displays and/or the virtual trackpad 530 is a physical trackpad.

FIGS. 5A-5Q illustrate a virtual trackpad 530 displayed on a portion of the table 513. FIGS. 5A-5Q illustrate a fingertip 599 of a user at various locations proximate to the virtual trackpad 530. For ease of illustration, other portions of the user (such as the rest of the finger or hand of the user) are not illustrated. Further, for ease of illustration, a shadow of the fingertip 599 is displayed at a location below the fingertip 599 to illustrate the difference between the fingertip 599 hovering over the virtual trackpad 530 and contacting the virtual trackpad 530.

FIGS. 5A-5Q illustrate a gaze direction indicator 550 that indicates a gaze direction of the user, e.g., where in the second XR environment 500 the user is looking. Although the gaze direction indicator 550 is displayed in FIGS. 5A-5Q, in various implementations, the gaze direction indicator 550 is not displayed.

FIG. 5A illustrates the second XR environment 500 during a first time period. During the first time period, the fingertip 599 is hovering over the upper-left corner of the virtual trackpad 530. During the first time period, the first virtual display 511 displays a cursor 540 in the upper-left corner of the first virtual display 511. During the first time period, the gaze direction indicator 550 is displayed over a portion of the first virtual display 511 indicating that the user is looking at the first virtual display 511 during the first time period.

FIG. 5B illustrates the second XR environment 500 during a second time period subsequent to the first time period. During the second time period, the fingertip 599 is hovering over the lower-right corner of the virtual trackpad 530. During the second time period, the first virtual display 511 displays the cursor 540 in the lower-right corner of the first virtual display 511. During the second time period, the gaze direction indicator 550 is displayed over a portion of the first virtual display 511 indicating that the user is looking at the first virtual display 511 during the second time period.

In various implementations, a trackpad is configured in either a relative mode or an absolute mode. The physical trackpad 430 of FIGS. 4A-4F is configured in the relative mode, whereas the virtual trackpad 530 of FIGS. 5A-5Q is configured in the absolute mode.

In various implementations, in the relative mode, motion of a fingertip contact in a direction, independent of the starting location of the fingertip contact on the trackpad, moves a cursor from a current location on the display in that direction. For example, in FIG. 4B, in response to the fingertip 499 contacting the physical trackpad 430 and moving to the right, the cursor 440 is moved to the right. As another example, in FIG. 4F, in response to the fingertip 499 contacting the physical trackpad 430 and moving to the right, the cursor 440 is moved further to the right on the first virtual display and, then, onto the second virtual display 412.

In various implementations, in the absolute mode, the fingertip is detected (either hovering or in contact) at a location of the trackpad and the cursor is displayed at a corresponding location of the display. For example, in FIG. 5A, the fingertip 599 is located hovering over the upper-left corner of the virtual trackpad 530 and, in response, the cursor 540 is displayed in the upper-left corner of the first virtual display 511. As another example, in FIG. 5B, the fingertip 599 is located hovering over the lower-right corner of the virtual trackpad 530 and, in response, the cursor is displayed in the lower-right corner of the first virtual display 511.

Further, in comparison to the relative mode in which the cursor is moved in response to a contact of the fingertip with the trackpad, in the absolute mode, the cursor is moved in response to detecting a new position of the fingertip either in contact or hovering over the trackpad. For example, in FIG. 4D, although the fingertip 499 is moved to the left, the cursor 440 is unmoved because the fingertip 499 is not in contact with the physical trackpad 430. In contrast, in FIG. 5B, when the fingertip 599 is moved from the upper-left corner of the virtual trackpad 530 to the lower-right corner of the virtual trackpad 530 without contacting the virtual trackpad 530, the cursor 540 is moved from the upper-left corner of the first virtual display 511 to the lower-right corner of the first virtual display 511.

FIG. 5C illustrates the second XR environment 500 during a third time period subsequent to the second time period. During the third time period, the fingertip 599 is contacting the lower-right corner of the virtual trackpad 530. During the third time period, the first virtual display 511 displays the cursor 540 in the lower-right corner of the first virtual display 511. During the third time period, the gaze direction indicator 550 is displayed over a portion of the first virtual display 511 indicating that the user is looking at the first virtual display 511 during the third time period.

In various implementations, the cursor is displayed in a different manner depending on whether the fingertip 599 is contacting the virtual trackpad 530 or hovering over the virtual trackpad 530. For example, in FIG. 5B, the cursor 540 is displayed in a hovering manner as an open circle indicating that the fingertip 599 is hovering over the virtual trackpad 530, whereas, in FIG. 5C, the cursor 540 is displayed in a contact manner as a closed circle (e.g., a solid black circle) indicating that the fingertip 599 is contacting the virtual trackpad 530 (or the table 513 over which the virtual trackpad 530 is displayed).

FIG. 5D illustrates the second XR environment 500 during a fourth time period subsequent to the third time period. During the fourth time period, the fingertip 599 has moved, while contacting the virtual trackpad 530, from the lower-right corner of the virtual trackpad 530 to the lower-left corner of the virtual trackpad 530. In response, the first virtual display 511 displays the cursor 540 in the lower-left corner of the first virtual display 511 in the contact manner. Further, in response, the first virtual display 511 displays a first mark 561 describing the path of the cursor 540 between the third time period and the fourth time period. During the fourth time period, the gaze direction indicator 550 is displayed over a portion of the first virtual display 511 indicating that the user is looking at the first virtual display 511 during the fourth time period.

In FIGS. 5A-5Q, the first virtual display 511 and the second virtual display 512 display instances of a drawing application in which, while the cursor 540 indicates that the fingertip 599 is in contact with the virtual trackpad 530 and is moved along a path, a mark is left to indicate the path.

FIG. 5E illustrates the second XR environment 500 during a fifth time period subsequent to the fourth time period. During the fifth time period, the fingertip 599 has lifted and is hovering over the lower-left corner of the virtual trackpad 530. In response, the first virtual display 511 displays the cursor 540 in the lower-left corner of the first virtual display 511 in the hovering manner. During the fifth time period, the gaze direction indicator 550 is displayed over a portion of the first virtual display 511 indicating that the user is looking at the first virtual display 511 during the fifth time period.

FIG. 5F illustrates the second XR environment 500 during a sixth time period subsequent to the fifth time period. During the sixth time period, the fingertip 599 has moved from hovering over the lower-left corner of the virtual trackpad 530 to hovering over the upper-right corner of the virtual trackpad 530. In response, the cursor 540 has moved from the lower-left corner of the first virtual display 511 to the upper-right corner of the first virtual display 511. During the sixth time period, the gaze direction indicator 550 is displayed over a portion of the first virtual display 511 indicating that the user is looking at the first virtual display 511 during the sixth time period.

FIG. 5G illustrates the second XR environment 500 during a seventh time period subsequent to the sixth time period. During the seventh time period, the fingertip 599 has not moved and remains hovering over the upper-right corner of the virtual trackpad 530. However, during the seventh time period, the gaze direction indicator 550 is displayed over a portion of the second virtual display 512 indicating that the user is looking at the second virtual display 512 during the seventh time period. Accordingly, the first virtual display 511 no longer displays the cursor 540 and the second virtual display 512 displays the cursor 540. Further, because the fingertip 599 is hovering over the upper-right corner of the virtual trackpad 530, the cursor 540 is displayed in the upper-right corner of the second virtual display 512.

In order to move the cursor 440 from one display to another, in FIGS. 4A-4F, in which the physical trackpad 430 is configured in the relative mode, the fingertip 499 moves from left to right (while contacting the physical trackpad 430), moves from right to left (while hovering over the physical trackpad 430), and moves, again, from left to right (while contacting the physical trackpad 430). However, in FIGS. 5A-5Q, in which the virtual trackpad 530 is configured in the absolute mode, such a process would not result in the cursor 540 moving from one display to another. Rather, if the fingertip 599 moves from the left side of the virtual trackpad 530 to the right side of the virtual trackpad 530 (or vice versa), the cursor 540 moves to the corresponding location on the virtual display regardless of contact. Thus, in order to move the cursor 540 from the first virtual display 511 to the second virtual display 512 a user changes gaze from the first virtual display 511 to the second virtual display 512.

FIG. 5H illustrates the second XR environment 500 during an eighth time period subsequent to the seventh time period. During the eighth time period, the fingertip 599 has moved from hovering over the upper-right corner of the virtual trackpad 530 to hovering over the upper-left corner of the virtual trackpad 530. In response, the cursor 540 has moved from the upper-right corner of the second virtual display 512 to the upper-left corner of the second virtual display 512. During the eighth time period, the gaze direction indicator 550 is displayed over a portion of the second virtual display 512 indicating that the user is looking at the second virtual display 512 during the eighth time period.

FIG. 5I illustrates the second XR environment 500 during a ninth time period subsequent to the eighth time period. During the ninth time period, the fingertip 599 has dropped to contact the upper-left corner of the virtual trackpad 530. In response, display of the cursor 540 has changed from hovering manner to the contact manner. During the ninth time period, the gaze direction indicator 550 is displayed over a portion of the second virtual display 512 indicating that the user is looking at the second virtual display 512 during the ninth time period.

FIG. 5J illustrates the second XR environment 500 during a tenth time period subsequent to the ninth time period. During the tenth time period, the fingertip 599 has moved from the upper-left corner of the virtual trackpad 530 to the center of the virtual trackpad 530. In response, the cursor 540 has moved from the upper-left corner of the second virtual display 512 to the center of the second virtual display 512 leaving a second mark 562 displayed on the second virtual display 512. During the tenth time period, the gaze direction indicator 550 is displayed over a portion of the second virtual display 512 indicating that the user is looking at the second virtual display 512 during the tenth time period.

FIG. 5K illustrates the second XR environment 500 during an eleventh time period subsequent to the tenth time period. During the eleventh time period, the fingertip 599 has lifted and moved from the center of the virtual trackpad 530 to a location corresponding to a location of the second mark 562. In response, the cursor 540 has moved from the center of the second virtual display 512 to a location of the second mark 562. During the eleventh time period, the gaze direction indicator 550 is displayed over a portion of the second virtual display 512 indicating that the user is looking at the second virtual display 512 during the eleventh time period.

FIG. 5L illustrates the second XR environment 500 during a twelfth time period subsequent to the eleventh time period. During the twelfth time period, the fingertip 599 has moved to select the second mark 562 (e.g., by dropping and lifting to briefly contact the trackpad at the location corresponding to the location of the second mark). In response, the second virtual display 512 displays a selection indicator 563 (in a first manner) surrounding the second mark 562 to indicate that the second mark 562 is selected. During the twelfth time period, the gaze direction indicator 550 is displayed over a portion of the second virtual display 512 indicating that the user is looking at the second virtual display 512 during the twelfth time period.

FIG. 5M illustrates the second XR environment 500 during a thirteenth time period subsequent to the twelfth time period. During the thirteenth time period, the fingertip 599 has dropped to hold the selection, e.g., associate the second mark 562 with the cursor 540. In response, the second virtual display 512 displays the cursor 540 in the contact manner and displays the selection indicator 563 in a second manner to indicate that the selection is held. During the thirteenth time period, the gaze direction indicator 550 is displayed over a portion of the second virtual display 512 indicating that the user is looking at the second virtual display 512 during the thirteenth time period.

FIG. 5N illustrates the second XR environment 500 during a fourteenth time period subsequent to the thirteenth time period. During the fourteenth time period, the fingertip 599 has not moved. However, during the fourteenth time period, the gaze direction indicator 550 is displayed over a portion of the first virtual display 511 indicating that the user is looking at the first virtual display 511 during the fourteenth time period. Accordingly, the second virtual display 512 no longer displays the cursor 540 and the first virtual display 511 displays the cursor 540 at the same corresponding location. Further, because the second mark 562 is associated with the cursor 540, the second virtual display 512 no longer displays the second mark 562 and the first virtual display 511 displays the second mark 562.

FIG. 5O illustrates the second XR environment 500 during a fifteenth time period subsequent to the fourteenth time period. During the fifteenth time period, the fingertip 599 has moved downward (closer to the perspective of the user) while contacting the virtual trackpad 530. In response, the cursor 540 (and the associated second mark 562) is moved downward on the first virtual display 511. During the fifteenth time period, the gaze direction indicator 550 is displayed over a portion of the first virtual display 511 indicating that the user is looking at the first virtual display 511 during the fifteenth time period.

FIG. 5P illustrates the second XR environment 500 during a sixteenth time period subsequent to the fifteenth time period. During the sixteenth time period, the fingertip 599 has lifted to hover over the virtual trackpad 530. In response, the cursor 540 is displayed in the hovering manner. Further, the second mark 562 is disassociated with the cursor 540 and the selection indicator is displayed in the first manner. During the sixteenth time period, the gaze direction indicator 550 is displayed over a portion of the first virtual display 511 indicating that the user is looking at the first virtual display 511 during the sixteenth time period.

FIG. 5Q illustrates the second XR environment 500 during a seventeenth time period subsequent to the sixteenth time period. During the seventeenth time period, the fingertip 599 has not moved. However, during the seventeenth time period, the gaze direction indicator 550 is displayed over a portion of the second virtual display 512 indicating that the user is looking at the second virtual display 511 during the seventeenth time period. Accordingly, the first virtual display 511 no longer displays the cursor 540 and the second virtual display 512 displays the cursor 540 at the same corresponding location.

Although FIGS. 4A-4F illustrate a physical trackpad 430 operating in a relative mode and FIGS. 5A-5Q illustrate a virtual trackpad 530 operating in an absolute mode, in various implementations, a physical trackpad operates in either a relative mode or an absolute mode or a virtual trackpad operates in either a relative mode or an absolute mode.

FIGS. 6A-6D illustrate a third XR environment 600 including a physical keyboard 630. FIGS. 6A-6D illustrate the third XR environment 600 from the perspective of a user of a first electronic device and displayed, at least in part, by a display of the first electronic device. FIGS. 6A-6D illustrate the third XR environment 600 during a series of time periods. In various implementations, each time period is an instant, a fraction of a second, a few seconds, a few hours, a few days, or any length of time.

The third XR environment 600 includes a plurality of objects, including one or more physical objects (e.g., a table 613, a physical keyboard 630, a second electronic device 620, and a physical display 612 associated with the second electronic device 620) and one or more virtual objects (e.g., a virtual display 611 and a device status indicator 690). In various implementations, certain objects (such as the physical objects 612, 613, 620, and 630 and the virtual display 611) are displayed at a location in the third XR environment 600, e.g., at a location defined by three coordinates in a three-dimensional (3D) XR coordinate system. Accordingly, when the user moves in the third XR environment 600 (e.g., changes either position and/or orientation), the objects are moved on the display of the first electronic device, but retain their location in the third XR environment 600. In various implementations, certain virtual objects (such as the device status indicator 690) are displayed at locations on the display such that when the user moves in the third XR environment 600, the objects are stationary on the display on the first electronic device. The device status indicator 690 displays information regarding the status of the first electronic device, such as the time and/or battery remaining.

Although FIGS. 6A-6D illustrate a virtual display 611, a physical display 612, and a physical keyboard 630, in various implementations, either or both of the displays 611 and 612 are virtual or physical displays and/or the physical keyboard 630 is a virtual keyboard.

FIGS. 6A-6D illustrate a gaze direction indicator 650 that indicates a gaze direction of the user, e.g., where in the third XR environment 600 the user is looking. Although the gaze direction indicator 650 is displayed in FIGS. 6A-6D, in various implementations, the gaze direction indicator 650 is not displayed.

The physical keyboard 630 is an input device coupled to the first electronic device. Accordingly, the first electronic device receives user input from the physical keyboard 630. The virtual display 611 is an output device displayed by the first electronic device. The physical display 612 is an output device coupled to the second electronic device 620.

Figure 6A:
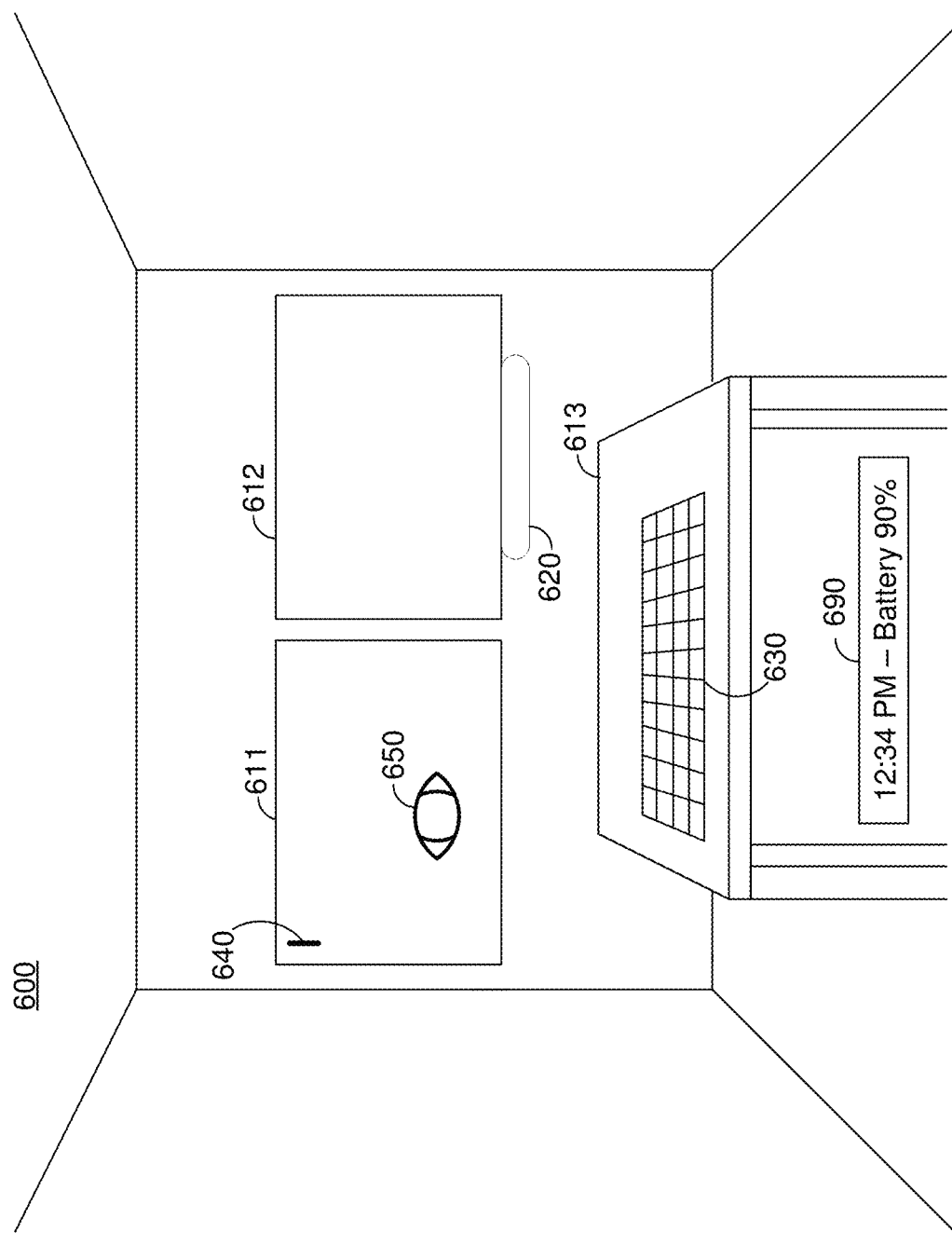
FIGS. 6A-6D illustrate a third XR environment including a physical keyboard.

FIG. 6A illustrates the third XR environment 600 during a first time period. During the first time period, the gaze direction indicator 650 is displayed over a portion of the virtual display 611 indicating that the user is looking at the virtual display 611 during the first time period. Accordingly, the virtual display 611 displays a cursor 640.

Figure 6B:
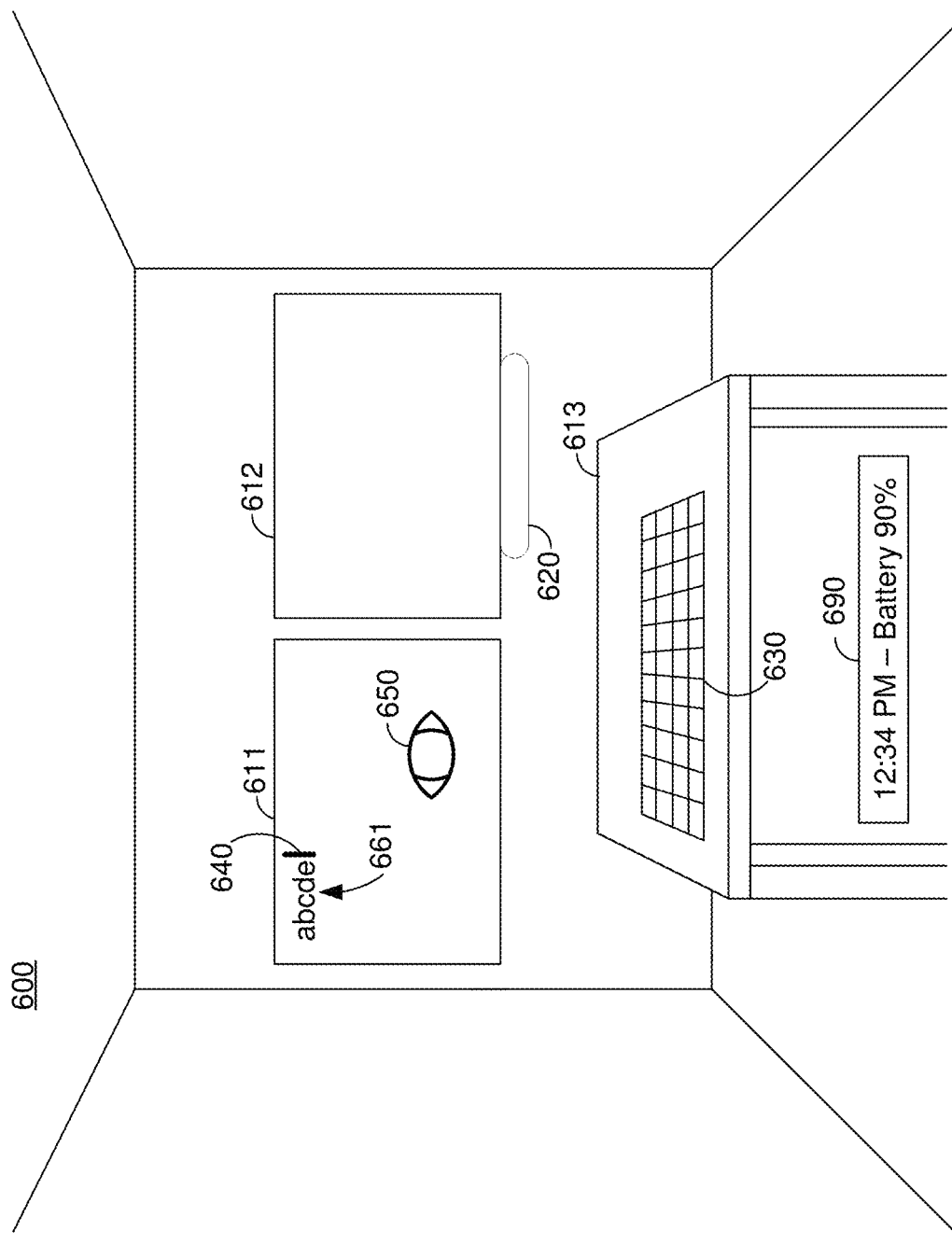

FIG. 6B illustrates the third XR environment 600 during a second time period subsequent to the first time period. Between the first time period and the second time period, the first electronic device received user input via the physical keyboard 630. Accordingly, during the second time period, the virtual display 611 displays first content 661. During the second time period, the gaze direction indicator 650 is displayed over a portion of the virtual display 611 indicating that the user is looking at the virtual display 611 during the second time period.

Figure 6C:
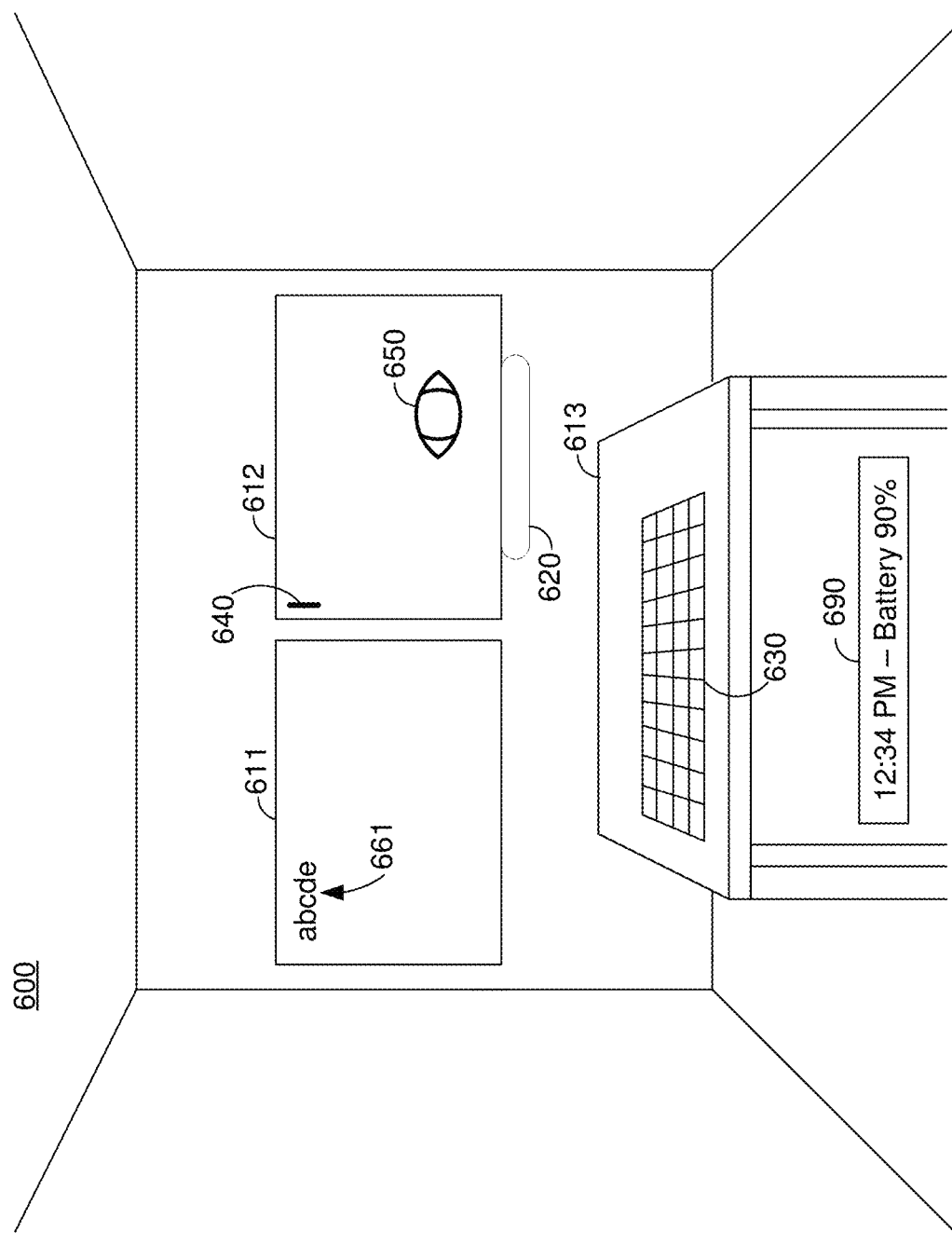

FIG. 6C illustrates the third XR environment 600 during a third time period subsequent to the second time period. During the third time period, the gaze direction indicator 650 is displayed over a portion of the physical display 612 indicating that the user is looking at the physical display 612 during the third time period. Accordingly, during the third time period, the physical display 612 displays the cursor 640.

Figure 6D:
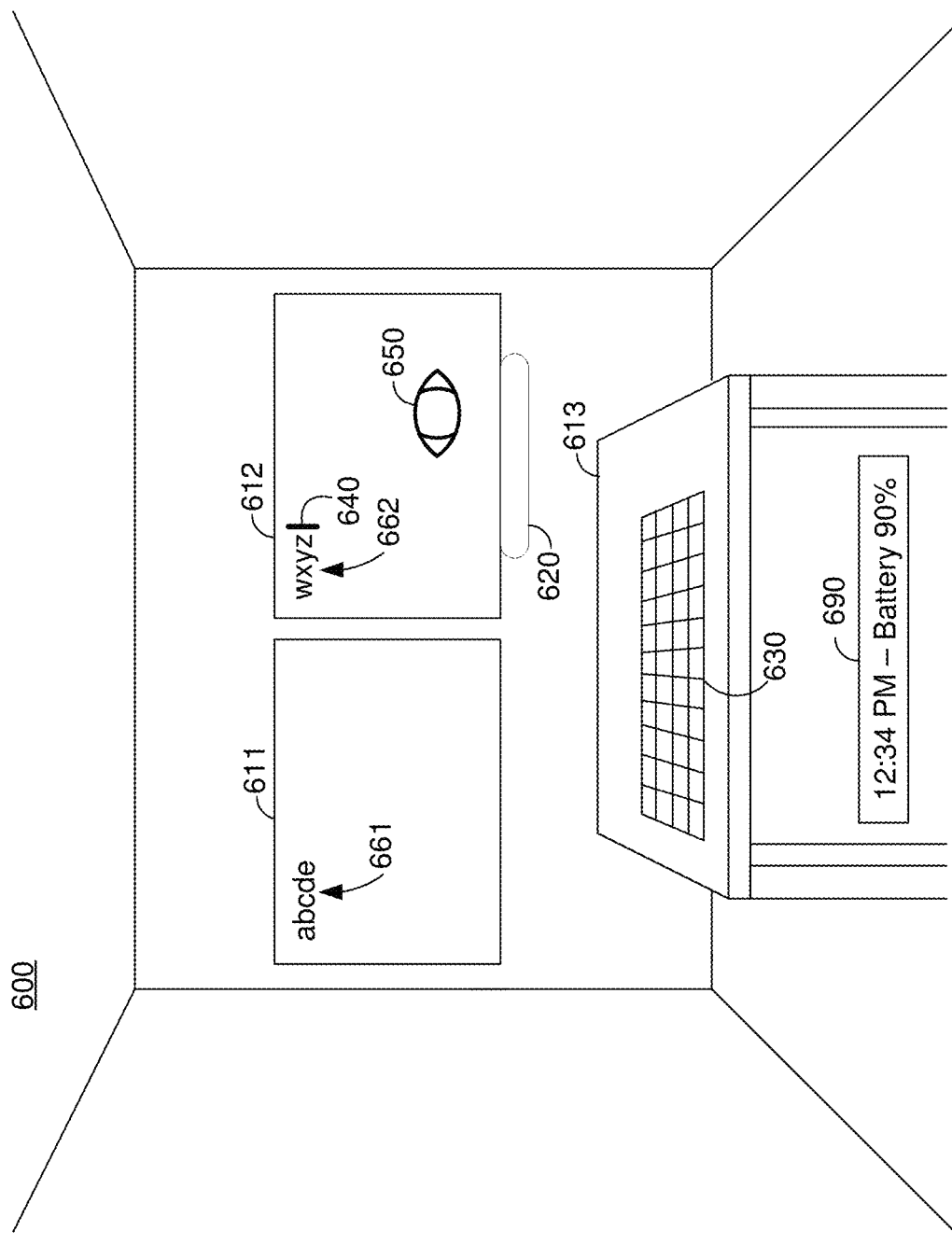

FIG. 6D illustrates the third XR environment 600 during a fourth time period subsequent to the third time period. Between the third time period and the fourth time period, the first electronic device received user input via the physical keyboard 630. Accordingly, during the fourth time period, the physical display 612 displays second content 662. In various implementations, the first electronic device receives user input via the physical keyboard 630 and, in response to determining that the user is looking at the physical display 612 associated with the second electronic device 620, transmits (e.g., forwards) the user input to the second electronic device 620. In various implementations, the first electronic device receives user input via the physical keyboard 630 and, in response to determining that the user is looking at the physical display 612 associated with the second electronic device 620, transmits (e.g., forwards) an image adjusted based on the user input to the second electronic device 620. During the fourth time period, the gaze direction indicator 650 is displayed over a portion of the virtual display 612 indicating that the user is looking at the physical display 612 during the fourth time period.

FIGS. 7A-7E illustrate a fourth XR environment 700 including a physical mouse 730. FIGS. 7A-7E illustrate the fourth XR environment 700 from the perspective of a user of a first electronic device and displayed, at least in part, by a display of the first electronic device. FIGS. 7A-7E illustrate the fourth XR environment 700 during a series of time periods. In various implementations, each time period is an instant, a fraction of a second, a few seconds, a few hours, a few days, or any length of time.

The fourth XR environment 700 includes a plurality of objects, including one or more physical objects (e.g., a table 713, a physical mouse 730, a second electronic device 720, and a physical display 712 associated with the second electronic device 720) and one or more virtual objects (e.g., a virtual display 711 and a device status indicator 790). In various implementations, certain objects (such as the physical objects 712, 713, 720, and 730 and the virtual display 711) are displayed at a location in the fourth XR environment 700, e.g., at a location defined by three coordinates in a three-dimensional (3D) XR coordinate system. Accordingly, when the user moves in the fourth XR environment 700 (e.g., changes either position and/or orientation), the objects are moved on the display of the first electronic device, but retain their location in the fourth XR environment 700. In various implementations, certain virtual objects (such as the device status indicator 790) are displayed at locations on the display such that when the user moves in the fourth XR environment 700, the objects are stationary on the display on the first electronic device. The device status indicator 790 displays information regarding the status of the first electronic device, such as the time and/or battery remaining.

Although FIGS. 7A-7D illustrate a virtual display 711, a physical display 712, and a physical mouse 730, in various implementations, either or both of the displays 711 and 712 are virtual or physical displays and/or the physical mouse 730 is a virtual mouse.

FIGS. 7A-7E illustrate a gaze direction indicator 750 that indicates a gaze direction of the user, e.g., where in the fourth XR environment 700 the user is looking. Although the gaze direction indicator 750 is displayed in FIGS. 7A-7E, in various implementations, the gaze direction indicator 750 is not displayed.

The physical mouse 730 is an input device coupled to the first electronic device. Accordingly, the first electronic device receives data indicative of user input from the physical mouse 730. The virtual display 711 is an output device coupled to the first electronic device. The physical display 712 is an output device coupled to the second electronic device 720.

Figure 7A:
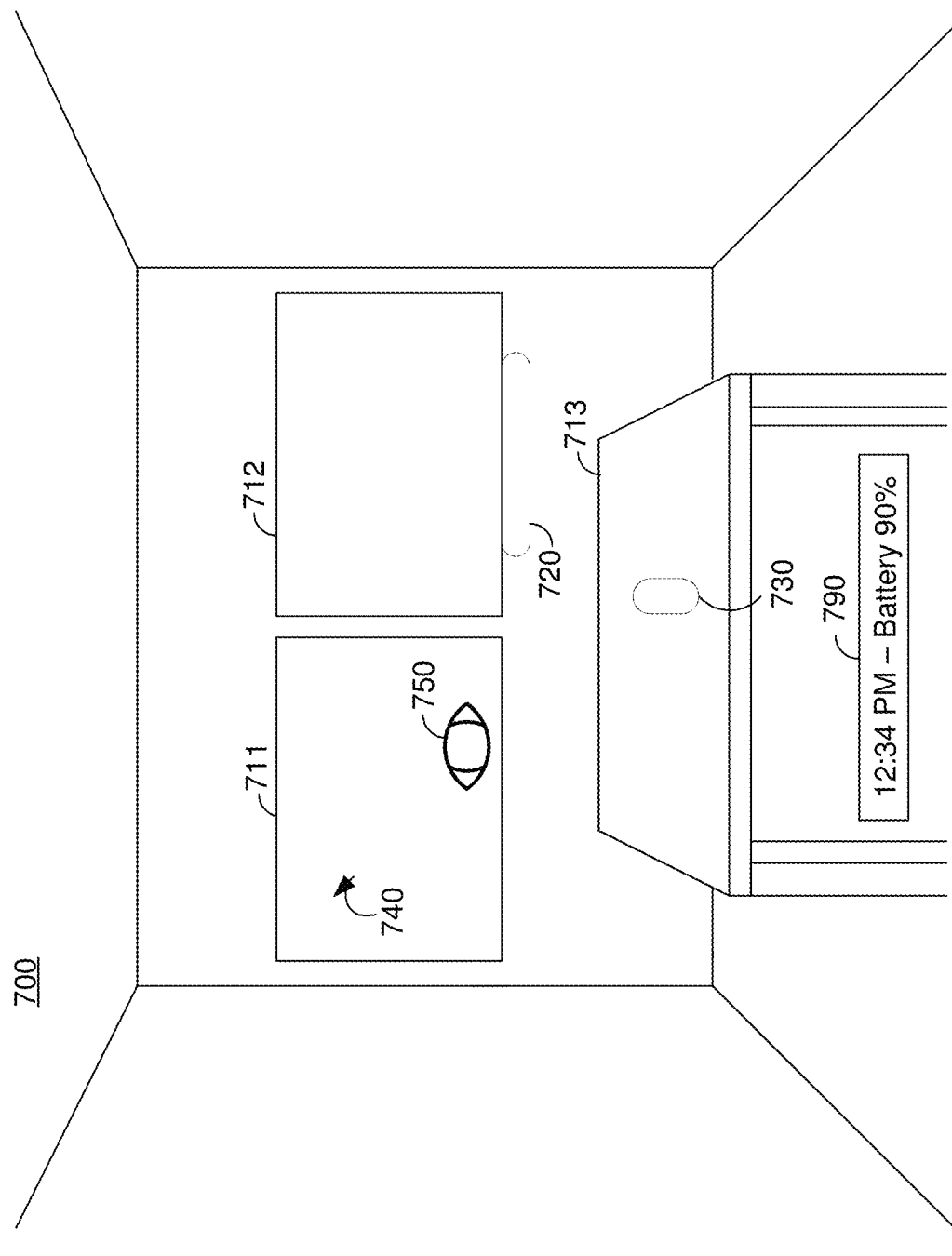
FIGS. 7A-7F illustrate a fourth XR environment including a physical mouse.

FIG. 7A illustrates the fourth XR environment 700 during a first time period. During the first time period, the gaze direction indicator 750 is displayed over a portion of the virtual display 711 indicating that the user is looking at the virtual display 711 during the first time period. Accordingly, the virtual display 711 displays a cursor 740 at a first location.

Figure 7B:
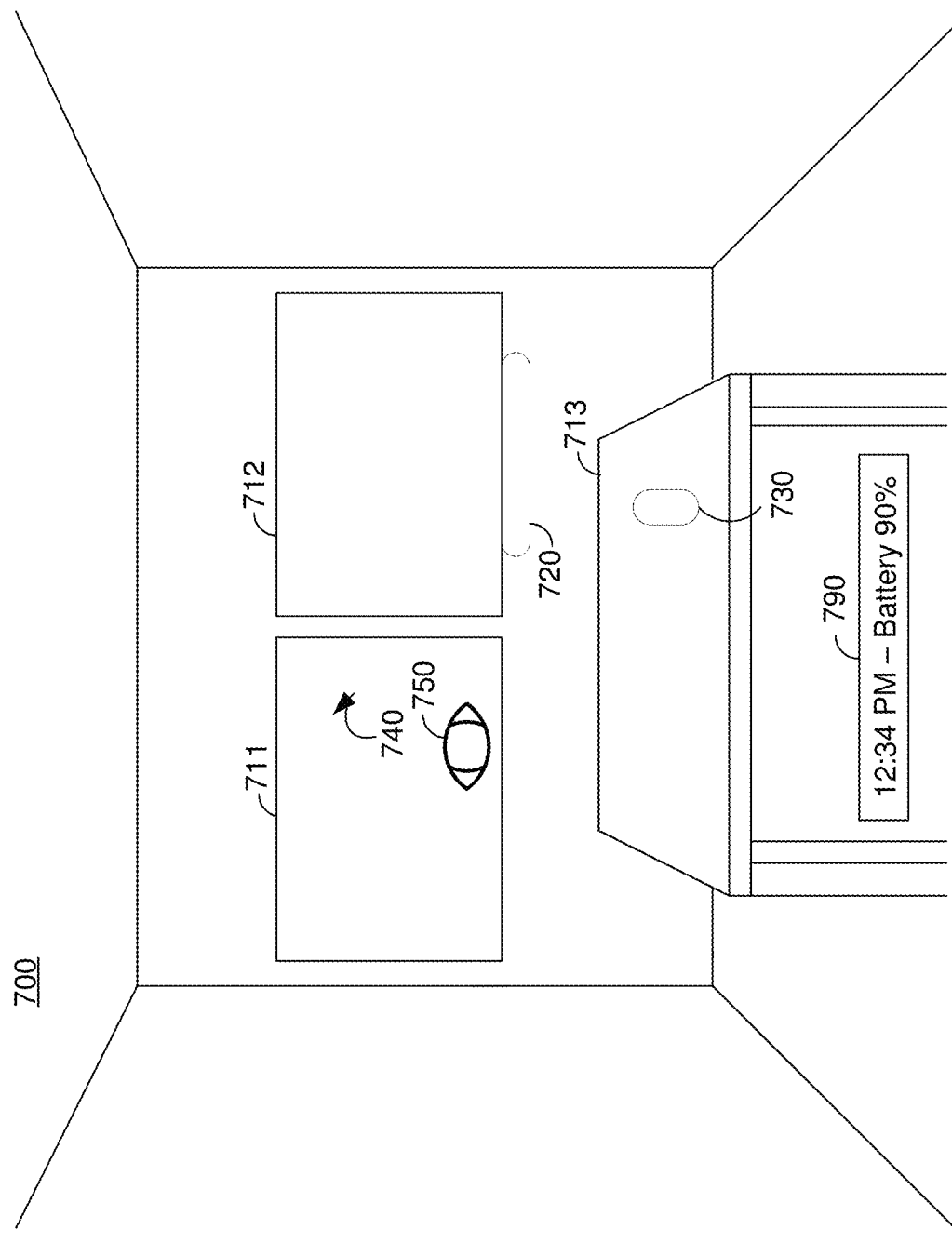

FIG. 7B illustrates the fourth XR environment 700 during a second time period subsequent to the first time period. During the second time period, the physical mouse 730 has moved to the right. Accordingly, the cursor 740 is moved to the right to a second location on the virtual display 711. During the second time period, the gaze direction indicator 750 is displayed over a portion of the virtual display 711 indicating that the user is looking at the virtual display 711 during the second time period.

Figure 7C:
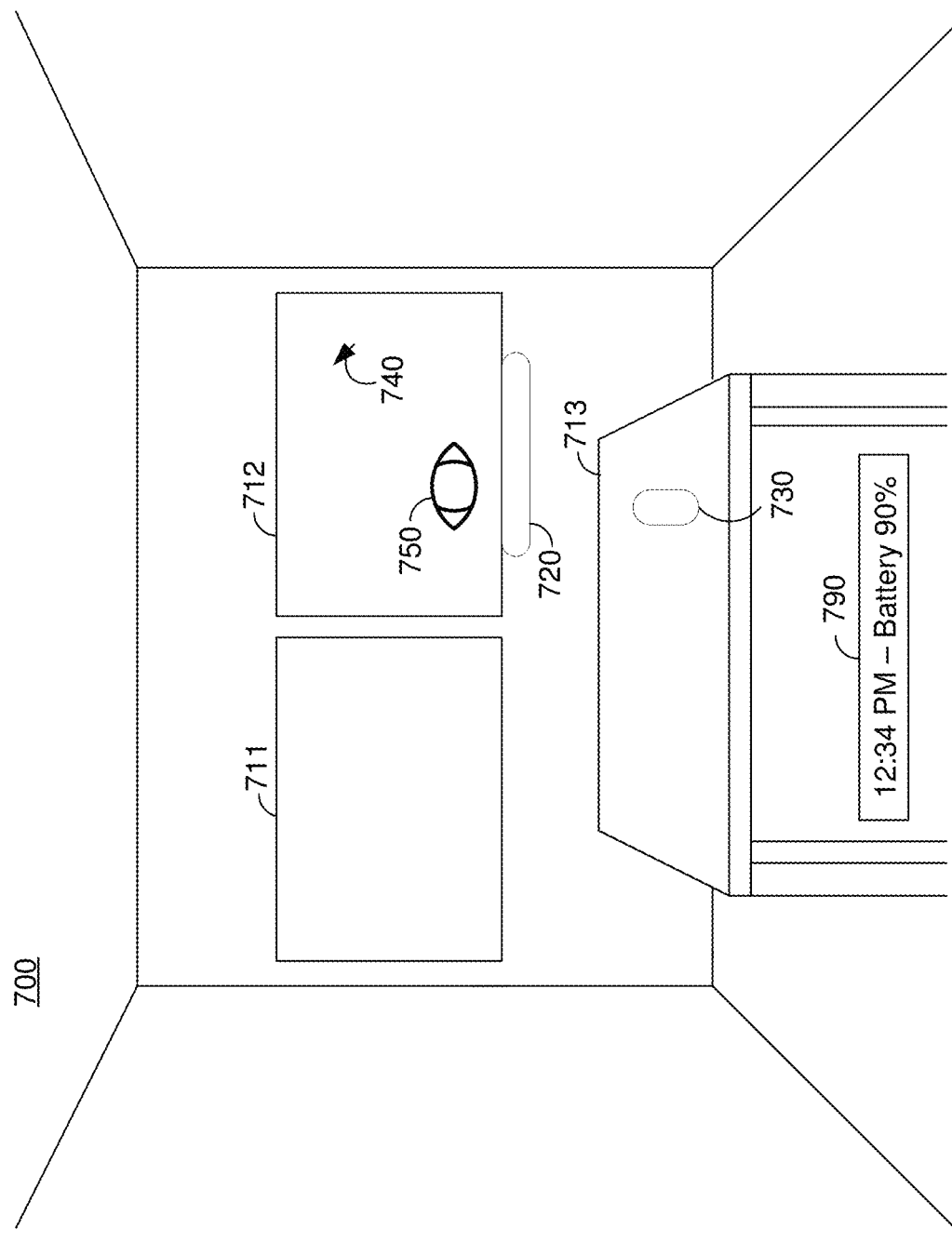

FIG. 7C illustrates the fourth XR environment 700 during a third time period subsequent to the second time period. During the third time period, the gaze direction indicator 750 is displayed over a portion of the physical display 712 indicating that the user is looking at the physical display 712 during the third time period. Accordingly, the cursor 740 is displayed at a first location on the physical display 712 corresponding to the second location on the virtual display 711 at which the cursor 740 was displayed during the second time period. For example, because the cursor 740 was displayed in the upper-right corner of the virtual display 711 during the second time period, the cursor 740 is displayed in the upper-right corner of the physical display 712 during the third time period. In various implementations, in response to detecting that the user is looking at the physical display 712 associated with the second electronic device 720, the first electronic device transmits a location of the cursor 740 to the second electronic device 720.

Figure 7D:
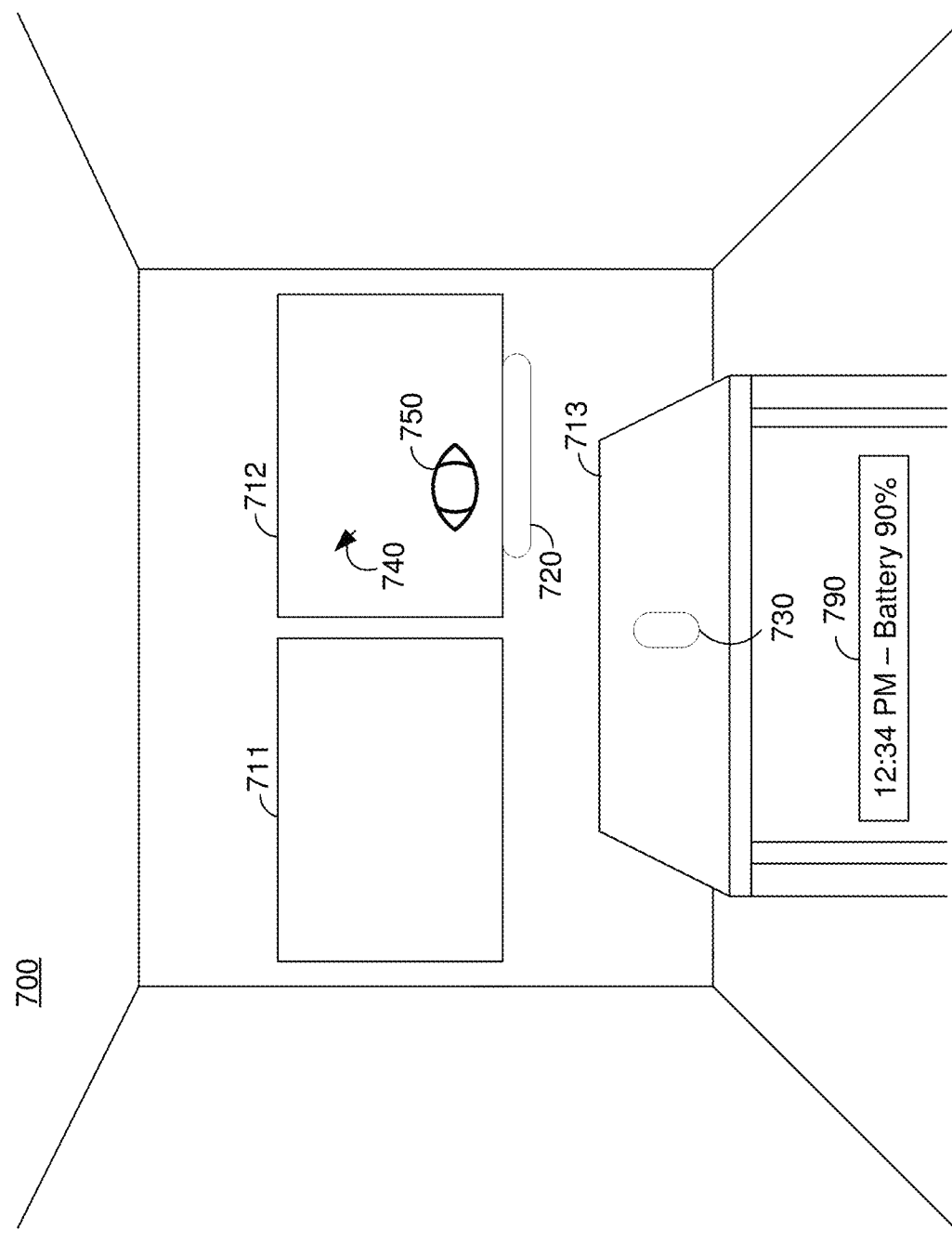

FIG. 7D illustrates the fourth XR environment 700 during a fourth time period subsequent to the third time period. During the fourth time period, the physical mouse 730 has moved to the left. Accordingly, the cursor 740 is moved to the left to a second location on the physical display 712. In various implementations, the first electronic device receives user input via the physical mouse 730 (e.g., movement of the physical mouse 730) and, in response to determining that the user is looking at the physical display 712 associated with the second electronic device 720, transmits (e.g., forwards) the user input to the second electronic device 720. In various implementations, the first electronic device receives user input via the physical mouse 730 and, in response to determining that the user is looking at the physical display 712 associated with the second electronic device 720, transmits (e.g., forwards) an image adjusted based on the user input to the second electronic device 720. During the fourth time period, the gaze direction indicator 750 is displayed over a portion of the physical display 712 indicating that the user is looking at the physical display 712 during the fourth time period.

Figure 7E:
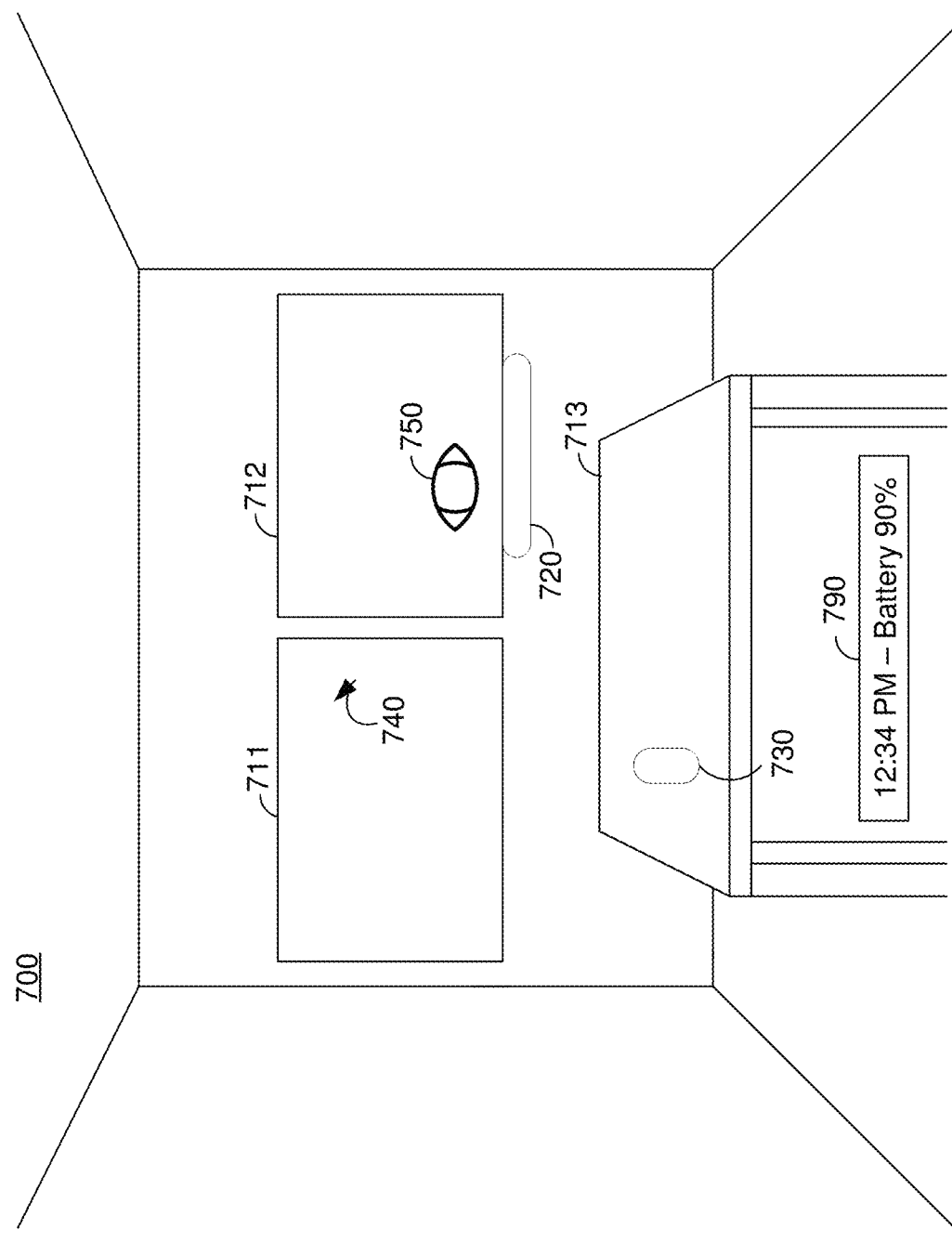

FIG. 7E illustrates the fourth XR environment 700 during a fifth time period subsequent to the fourth time period. During the fifth time period, the physical mouse 730 has moved to the left. In response, the cursor 740 has moved to the left, being displayed in the upper-right corner of the virtual display 711. Accordingly, in various implementations, the cursor 740 moved to the left and, upon reaching the edge of the physical display 712, jumped to the proximate edge of the virtual display 711, and continued to move to the left. During the fifth time period, the gaze direction indicator 750 is displayed over a portion of the physical display 712 indicating that the user is looking at the physical display 712 during the fifth time period. Thus, even though the user is looking at the physical display 712, the cursor 740 is displayed on the virtual display 711.

Figure 7F:
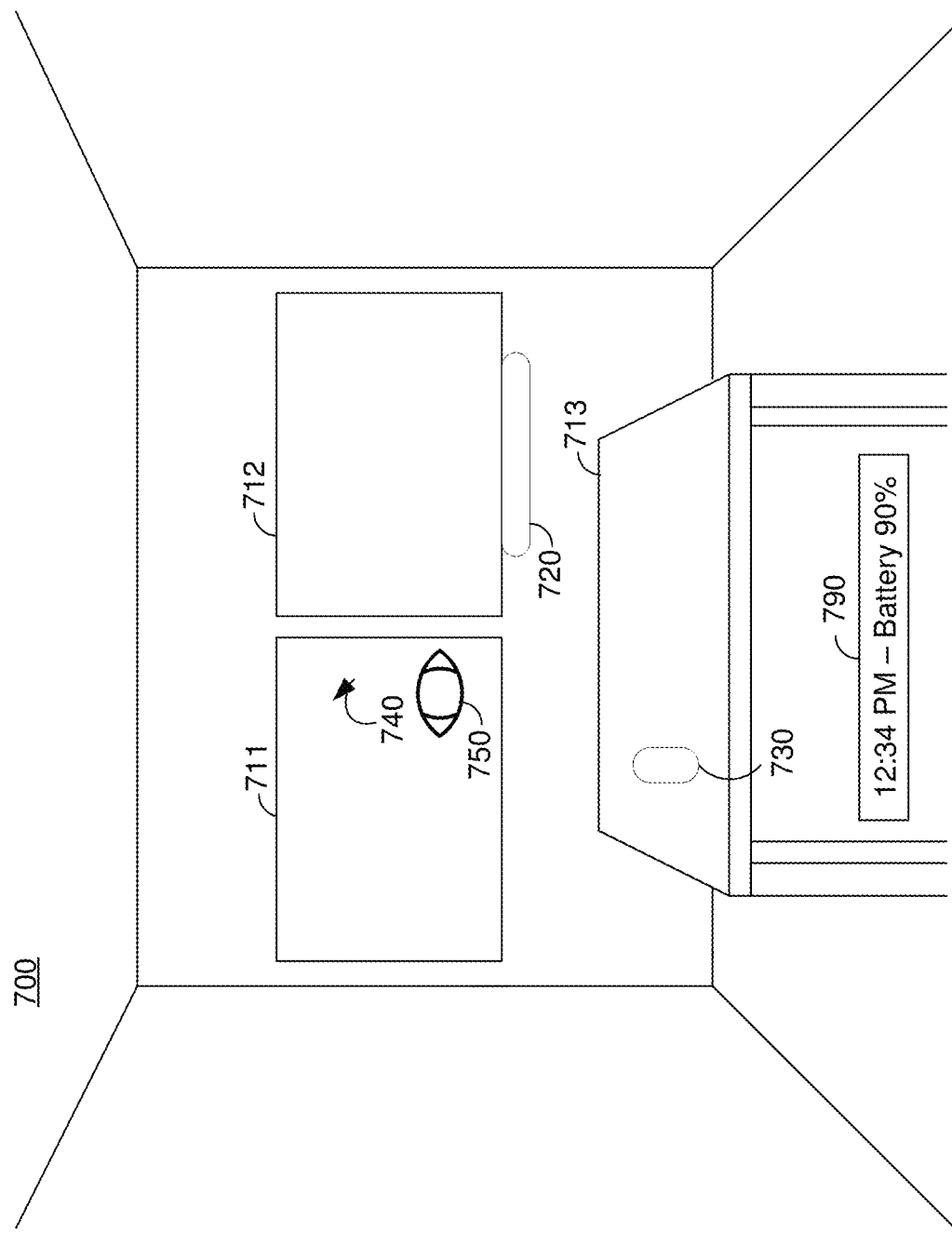

FIG. 7F illustrates the fourth XR environment 700 during a sixth time period subsequent to the fifth time period. During the sixth time period, the physical mouse 730 has not moved. Accordingly, the cursor 740 is not moved. During the fifth time period, the gaze direction indicator 750 is displayed over a portion of the virtual display 711 indicating that the user is looking at the virtual display 711 during the sixth time period. Thus, the display which the user is looking at has changed, the cursor 740 has not moved.

Thus, in various implementations, when the cursor is displayed at a particular location on a particular display and the gaze of the user changed to be directed at the particular display, the cursor does not move from the particular location on the particular display.

In the examples discussed above, it is to be appreciated that, in various implementations, each input device and each display could be either physical or virtual.

In various examples discussed above, the cursor is switched between displays when the user changes the display at which the user is looking. In various implementations, a user may desire to look at a second display while maintaining the cursor on the first display. For example, a user may desire to transcribe a document displayed on a second display by directing user input to a word processing application on a first display. As another example, a user may desire to take notes regarding a video presentation displayed on a second display by directing user input to a notes application on a first display. As another example, a user may desire to, based on an image displayed on a second display, paint a picture by directing user input to a paint application on a first display.

Accordingly, in various implementations, a user can lock the cursor to a first display such that, when the user changes the display at which the user is looking, the cursor remains on the first display and user inputs are directed to the first display. In various implementations, the user locks the cursor by selecting an affordance, issuing a verbal command, input a keystroke combination, or via any other user input. In various implementations, the electronic device locks the cursor without explicit user input. For example, in various implementations, if the user in entering a continuous input, such as typing a word phrase, or sentence via a keyboard or drawing a continuous stroke with a trackpad or mouse, the cursor is locked. In various implementations, the cursor is locked for a predefined time period after receiving a user input. Similarly, in various implementations, the user can unlock the cursor, via user input, such that, when the user changes the display at which the user is looking, the cursor is switched to the display at which the user is looking.

Figure 8:
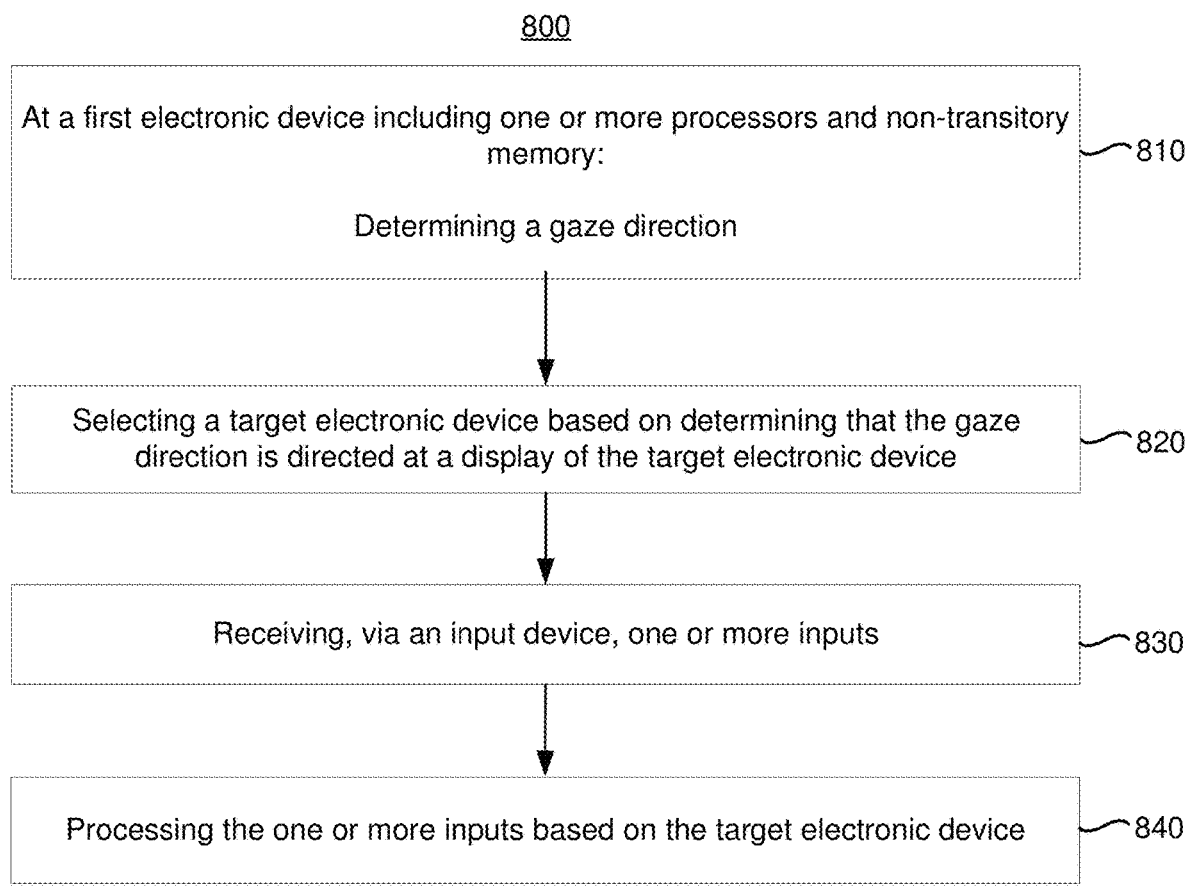
FIG. 8 is a flowchart representation of a method of processing inputs in accordance with some implementations.

FIG. 8 is a flowchart representation of a method 800 of processing input in accordance with some implementations. In various implementations, the method 800 is performed by a device including a display, one or more processors, and non-transitory memory (e.g., the electronic device 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the first electronic device determining a gaze direction. In various implementations, the first electronic device includes an eye tracker that determines a gaze direction. In various implementations, the eye tracker determines the gaze direction based on an image of at least one eye of a user. In various implementations, the first electronic device includes an IMU (inertial measurement unit) that determines a head pose of the user. In various implementations, the first electronic device determines the gaze direction based on the head pose, e.g., assuming that when a user turns their head to the left, the gaze direction is also to the left.

The method 800 continues, in block 820, with the device selecting a target electronic device based on determining that the gaze direction is directed to a display of the target electronic device. For example, in FIG. 6A, the first electronic device determines that the gaze direction is directed towards the virtual display 611 and selects the first electronic device itself as the target electronic device. As another example, in FIG. 6C, the first electronic device determines that the gaze direction is directed towards the physical display 612 and selects the second electronic device 620 as the target device.

In various implementations, the display is a virtual display (displayed by a physical display of the target electronic device). Thus, in various implementations, selecting the target electronic device is based on determining that the gaze direction is directed to a portion of the display of the target electronic device, e.g., the portion of the physical display upon which a virtual display is displayed.

In various implementations, determining that the gaze direction is directed to a display of the target electronic device includes detecting the display of the target electronic device in an image of the environment including the display of the target electronic device and, in various implementations, determining the location of the display of the target electronic device in the image and/or the environment. In various implementations, although the display of the target electronic device is in environment, the target electronic device is not.

In various implementations, the display of the target electronic device is communicatively coupled to the target electronic device. In various implementations, the display of the target electronic device is controlled by the target electronic device, e.g., the target electronic device instructs the display as to what is displayed by the display.

The method 800 continues, in block 830, with the first electronic device receiving, via an input device, one or more inputs. In various implementations, the one or more inputs include data indicative of action of the user, e.g., moving a part of the body of the user. In various implementations, the one or more inputs include movement of a cursor and/or insertion of text. In various implementations, the input device includes at least one of a physical keyboard, a physical mouse, a physical trackpad, or a physical switch device. In various implementations, the input device includes at least one of a virtual keyboard, a virtual mouse, a virtual trackpad, or a virtual switch device.

A switch device is a device that generates a binary input stream including binary inputs. The switch device can include, for example, a switch that produces an "on" input when the switch is pressed and an "off" input when the switch is not pressed. The switch device can include, as another example, a camera that produces an "on" input when the user turns his/her head to the left and an "off" input when the camera does not detect this motion. The binary input stream can be, for example, a voltage waveform that has a first value (e.g., 5 V) to indicate an "on" input and a second value (e.g., 0 V) to indicate an "off" input.

In various implementations, the switch device can generate multiple binary input streams. The switch device can include, for example, a first switch and a second switch. The first switch produces a first "on" input when the first switch is pressed and a first "off" input when the first switch is not pressed. Similarly, the second switch produces a second "on" input when the second switch is pressed and a second "off" input when the second switch is not pressed. The first "on" input and the second "on" input can have different effects in different contexts. As another example, the switch device can include a camera that produces a first "on" input when the user turns his/her head to the left and a second "on" input when the user turns his/her head to the right.

A variety of switch devices for people of limited mobility can be used to generate switch inputs, including a device that detects when air in blown into a straw or when the person blinks. People of limited mobility may particularly have difficulties in operating multiple input devices for multiple electronic devices and may particularly benefit from the use of a single input device (e.g., a switch device) to operate multiple electronic devices.

In various implementations, the method 800 further includes displaying a virtual input device, such as a virtual keyboard or a virtual mouse, and one or more inputs include data indicative of user interaction with the virtual input device. In various implementations, the method 800 further includes displaying a virtual trackpad and the one or more inputs include data indicative of movement of a fingertip of the user with respect to the virtual trackpad. In various implementations, the one or more inputs are generated by a finger-worn device with an IMU that detects the movement. In various implementations, the one or more inputs are generated by a camera tracking the fingertip of the user. Thus, in various implementations, the input device is a camera. In various implementations, the input device is a microphone. For example, in various implementations, the input includes data indicative of the user speaking certain words.

The method 800 continues, in block 840, with the first electronic device processing the one or more inputs based on the target electronic device. In various implementations, the target electronic device is the first electronic device and processing the one or more inputs includes updating a first display of the first electronic device. In various implementations, the first display is a virtual display. For example, in FIG. 6B, because the gaze direction is directed to the virtual display 611, the first electronic device is the target device and, in response to input received from the physical keyboard 630, the first electronic device updates the virtual display 611 to include the first content 661. As another example, in FIG. 7B, because the gaze direction is directed to the virtual display 711, the first electronic device is the target device and, in response to input received from the physical mouse 730, the first electronic device updates the virtual display 711 by moving the cursor 740.

In various implementations, the target electronic device is a second electronic device and processing the one or more inputs includes transmitting the one or more inputs to the second electronic device. For example, in FIG. 6D, because the gaze direction is directed to the physical display 612, the second electronic device 620 is the target electronic device and, in response to input received from the physical keyboard 630, the first electronic device transmits the input to the second electronic device 620, which, in turn, updates the physical display 612 to include the second content 662. As another example, in FIG. 7D, because the gaze direction is directed to the physical display 712, the second electronic device 720 is the target electronic device and, in response to input received from the physical mouse 730, the first electronic device transmits the input to the second electronic device 720, which, in turn, updates the physical display 712 by moving the cursor 740. In various implementations, the target electronic device is a second electronic device and processing the one or more inputs includes updating display content based on the one or more inputs and transmitting the updated display content to the second electronic device. In various implementations, the second electronic device includes a physical display.

In various implementations, the method 800 includes, while the gaze direction is directed to a first display of the first electronic device, displaying a cursor at a first location of the first display. For example, in FIG. 7B, the gaze direction is directed to the virtual display 711 and the first electronic device displays the cursor 740 at a first location of the virtual display 711.

In various implementations, the method 800 includes, in response to determining the gaze direction is directed to a second display, causing display of the cursor at a second location of the second display, wherein the second location corresponds to the first location. For example, in FIG. 7C, in response to determining that the gaze direction is directed to the physical display 712 of the second electronic device 720, the first electronic device transmits data to the second electronic device, e.g., the first location, causing the second electronic to display the cursor 740 at a second location of the physical display 712.

In various implementations, the first display is associated with a first two-dimensional coordinate system and the first location is associated with a first set of coordinates in the first two-dimensional coordinate system. In various implementations, the second display is associated with a second two-dimensional coordinate system and the second location is associated with a second set of coordinates in the second two-dimensional coordinate system. In various implementations, the first location is the same as the second location. Thus, if the first location is (0.25, 0.75) indicating that the first location is one-quarter of the way from the left edge to the right edge and three-quarters of the way from the top to the bottom, the second location is also (0.25, 0.75). In various implementations, the second set of coordinates is proportional to the first set of coordinates. Thus, if the first display has a resolution of 1280×600, the second display has a resolution of 1600×900, and the first location is (320, 450), the second location is (400, 675). Thus, the second location is the same proportional distance horizontally from the left edge of the second display as the first location is from the left edge of the first display and the second location is the same proportional distance vertically from the top of the second display as the first location is from the top of the first display.

In various implementations, the first location and the second location correspond to a third location of the input device, such as a trackpad configured in the absolute mode. In various implementations, the input device is associated with a third two-dimensional coordinate system and the third location is associated with a third set of coordinates in the third two-dimensional coordinate system. In various implementations, the third location is the same as at least one of the first location and the second location. Thus, if the first location and/or the second location is (0.25, 0.75), the third location is (0.25, 0.75). In various implementations, the third set of coordinates is proportional to at least one of the first set of coordinates and the second set of coordinates. Thus, if the first display has a resolution of 1280×600, the second display has a resolution of 1600×900, and first location is (320, 450), the second location is (400, 675), the third location may be (25, 75). Thus, for example, the third location is the same proportional distance horizontally from the left edge of the trackpad as the first location is from the left edge of the first display and the third location is the same proportional distance vertically from the top of the trackpad as the first location is from the top of the first display.

In various implementations, the method 800 further includes, in response to determining that the gaze direction is directed to the second display, ceasing display of the cursor at the first location of the first display. For example, in FIG. 7C, the first electronic device ceases display of the cursor 740 on the virtual display 711.

In various implementations, the second display is a virtual display of the first electronic device. In various implementations, the second display is a physical display of a second electronic device. In various implementations, causing display of the cursor at the second location includes transmitting instructions to display the cursor at the second location or transmitting display content showing the cursor at the second location to the second electronic device.

In various implementations, the method 800 further includes, while the gaze direction is directed to a first display of the first electronic device, receiving selection of content and, in response to determining the gaze direction is directed to a second display, causing display of content on the second display. In various implementations, the second display is a physical display of a second electronic device and causing display of the content includes transmitting the content to the second electronic device. For example, in FIG. 5M, the electronic device received input from the virtual trackpad 530 selecting the second mark 562. In FIG. 5N, in response to the gaze direction being directed at the first virtual display 511, the second mark 562 is moved from the second virtual display 512 to the first virtual display 511. If the first virtual display 511 were the display of a second electronic device, the electronic device would transmit data indicative of the second mark 562 to the second electronic device which would, in turn, cause display of the second mark 562 on the first virtual display 511.

In various implementations, the method 800 further includes, receiving first input moving the cursor in a direction to an edge of the second display and, in response to receiving the first input, causing display of the cursor moving in the direction to the edge of the second display. In various implementations, the method 800 further includes receiving second input moving the cursor further in the direction and, in response to receiving the second input, displaying the cursor on the first display. For example, prior to the fifth time period displayed in FIG. 7E, the first electronic device received first input from the physical mouse 730 moving the cursor 740 leftward to the left edge of the physical display 712 and, in response, transmitted that first input to the second electronic device 720. Further, the first electronic device received second input from the physical mouse 730 moving the cursor leftward and, in response, displayed the cursor 740 on the right edge of the virtual display 711.

In various implementations, the cursor is locked to a particular display or, more particularly, the first electronic device is in a locked state in which a change in gaze direction does not change the target electronic device. Thus, in various implementations, the method 800 further includes determining a changed gaze direction, selecting based on the changed gaze direction, a changed target electronic device, and receiving, via the input device, one or more additional inputs. In response to determining that first electronic device is in a locked state, the first electronic device processes the one or more additional inputs based on the target electronic device (e.g., not the changed target electronic device). In response to determining that the first electronic device is in an unlocked state, the first electronic device processes the one or more additional inputs based on the changed electronic device. In various implementations, determining that the electronic device is in the locked state includes determining that the one or more additional inputs are a continuous input. In various implementations, determining that the electronic device is in the locked state includes determining that the amount of time elapsed since a input was received is less than a threshold amount.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first electronic device with one or more processors and non-transitory memory:
     receiving, via an input device, a first set of one or more inputs;
     in response to determining that a first gaze direction is directed to a virtual display of the first electronic device while the first set of one or more inputs are received, updating the virtual display of the first electronic device based on the first set of one or more inputs;
     receiving, via the input device, a second set of one or more inputs; and
     in response to determining that a second gaze direction is directed to a virtual display of a second electronic device while the second set of one or more inputs are received, transmitting the second set of one or more inputs to the second electronic device.

2. The method of claim 1, further comprising:
   while the first gaze direction is directed to the virtual display of the first electronic device, displaying a cursor at a first location of the virtual display of the first electronic device; and
   in response to determining the second gaze direction is directed to a virtual display of the second electronic device, causing display of the cursor at a second location of the virtual display of the second electronic device, wherein the second location corresponds to the first location.

3. The method of claim 2, further comprising, in response to determining that the second gaze direction is directed to the virtual display of the second electronic device, ceasing display of the cursor at the first location of the virtual display of the first electronic device.

4. The method of claim 2, wherein the first location and the second location correspond to a third location of the input device.

5. The method of claim 2, further comprising:
   receiving first input moving the cursor in a direction to an edge of the virtual display of the second electronic device;
   in response to receiving the first input, causing display of the cursor moving in the direction to the edge of the virtual display of the second electronic device;
   receiving second input moving the cursor further in the direction; and in response to receiving the second input, displaying the cursor on the virtual display of the first electronic device.

6. The method of claim 1, further comprising:
while the first gaze direction is directed to the virtual display of the first electronic device, receiving selection of content; and
in response to determining the second gaze direction is directed to a virtual display of the second electronic device, causing display of the content on the virtual display of the second electronic device.

7. The method of claim 1, wherein the first set of one or more inputs include movement of a cursor or insertion of text.

8. The method of claim 1, wherein the input device includes at least one of a physical keyboard, a physical mouse, a physical trackpad, or a physical switch device.

9. The method of claim 1, wherein the input device includes at least one of a virtual keyboard, a virtual mouse, a virtual trackpad, or a virtual switch device.

10. The method of claim 1, further comprising displaying a virtual trackpad, wherein the first set of one or more inputs include data indicative of movement of a fingertip with respect to the virtual trackpad.

11. The method of claim 1, further comprising:
receiving, via the input device, a third set of one or more inputs; and
in response to determining that a third gaze direction is directed to the virtual display of the second electronic device while the third set of one or more inputs are received and determining that the first electronic device is in a locked state, updating the virtual display of the first electronic device based on the third set of one or more inputs.

12. The method of claim 11, further comprising, in response to determining that the third gaze direction is directed to the virtual display of the second electronic device while the third set of one or more inputs are received and determining that the first electronic device is in an unlocked state, transmitting the third set of one or more inputs to the second electronic device.

13. The method of claim 11, wherein determining that the first electronic device is in the locked state includes determining that the third set of one or more inputs are continuous with the first set of one or more inputs.

14. A first electronic device comprising:
a non-transitory memory; and
one or more processors to:
receive, via an input device, a first set of one or more inputs;
in response to determining that a first gaze direction is directed to a virtual display of the first electronic device while the first set of one or more inputs are received, update the virtual display of the first electronic device based on the first set of one or more inputs;
receiving, via the input device, a second set of one or more inputs; and
in response to determining that a second gaze direction is directed to a virtual display of a second electronic device while the second set of one or more inputs are received, transmit the second set of one or more inputs to the second electronic device.

15. The first electronic device of claim 14, wherein the one or more processors are further to:
while the first gaze direction is directed to the virtual display of the first electronic device, display a cursor at a first location of the virtual display of the first electronic device; and
in response to determining the second gaze direction is directed to a virtual display of the second electronic device, cause display of the cursor at a second location of the virtual display of the second electronic device, wherein the second location corresponds to the first location.

16. The first electronic device of claim 15, wherein the one or more processors are further to, in response to determining that the second gaze direction is directed to the virtual display of the second electronic device, cease display of the cursor at the first location of the virtual display of the first electronic device.

17. The first electronic device of claim 14, wherein the input device includes at least one of a physical keyboard, a physical mouse, a physical trackpad, or a physical switch device.

18. The first electronic device of claim 14, wherein the input device includes at least one of a virtual keyboard, a virtual mouse, a virtual trackpad, or a virtual switch device.

19. The first electronic device of claim 14, further comprising displaying a virtual trackpad, wherein the first set of one or more inputs include data indicative of movement of a fingertip with respect to the virtual trackpad.

20. A non-transitory memory storing one or more programs, which, when executed by one or more processors of a first electronic device including a display, cause the device to:
receive, via an input device, a first set of one or more inputs;
in response to determining that a first gaze direction is directed to a virtual display of the first electronic device while the first set of one or more inputs are received, update the virtual display of the first electronic device based on the first set of one or more inputs;
receive, via the input device, a second set of one or more inputs; and
in response to determining that a second gaze direction is directed to a virtual display of the second electronic device while the second set of one or more inputs are received, transmit the second set of one or more inputs to the second electronic device.

* * * * *